(12) United States Patent
Choi et al.

(10) Patent No.: US 12,217,504 B2
(45) Date of Patent: Feb. 4, 2025

(54) METHOD AND APPARATUS FOR RECOGNIZING TARGET DEVICE, FOR AUGMENTED REALITY

(71) Applicant: SAMSUNG ELECTRONICS CO., LTD., Suwon-si (KR)

(72) Inventors: Junsu Choi, Suwon-si (KR); Hyunkee Min, Suwon-si (KR); Jihoon Sung, Suwon-si (KR); Sunkee Lee, Suwon-si (KR); Junghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/112,726

(22) Filed: Feb. 22, 2023

(65) Prior Publication Data

US 2023/0196768 A1 Jun. 22, 2023

Related U.S. Application Data

(63) Continuation of application No. PCT/KR2021/008546, filed on Jul. 6, 2021.

(30) Foreign Application Priority Data

Aug. 25, 2020 (KR) ........................ 10-2020-0107208

(51) Int. Cl.
*G06V 20/20* (2022.01)
*G06F 3/0483* (2013.01)
*G01S 5/02* (2010.01)

(52) U.S. Cl.
CPC ............ *G06V 20/20* (2022.01); *G06F 3/0483* (2013.01); *G01S 5/0218* (2020.05)

(58) Field of Classification Search
CPC .......... G06V 20/20; G06F 3/0483; G01S 5/02
See application file for complete search history.

(56) References Cited

U.S. PATENT DOCUMENTS 6,539,065 B1 * 3/2003 Furukawa .............. H04H 40/18
375/259
10,104,635 B2 10/2018 Malik et al.
(Continued)

FOREIGN PATENT DOCUMENTS

JP     2017068601     *  9/2015  .......... G06F 3/0481
JP     2017-068601 A     4/2017
(Continued)

OTHER PUBLICATIONS

Stijn Wielandt, "Indoor multipath assisted angle of arrival localization", Ku Leuven—Arenberg Doctoral School, Nov. 2017, 206 pages.

(Continued)

*Primary Examiner* — Phenuel S Salomon
(74) *Attorney, Agent, or Firm* — Nixon & Vanderhye P.C.

(57) ABSTRACT

An electronic device may include a display, a camera, a communication circuitry, and a processor, wherein the processor may be configured to: control to transmit an image obtained through the camera to an external device through the communication circuitry, receive an AR image including at least one object from the external device through the communication circuitry and display same through the display, recognize a target object from among the at least one object, and map one of peripheral devices found on a data communication link through the communication circuitry to a target device corresponding to the recognized target object. Various embodiments are possible.

19 Claims, 19 Drawing Sheets

(56) References Cited

U.S. PATENT DOCUMENTS

| | | | |
|---|---|---|---|
| 10,339,383 B2* | 7/2019 | Lee | G06T 11/60 |
| 10,523,806 B2 | 12/2019 | Vissa et al. | |
| 2009/0110033 A1* | 4/2009 | Shattil | H04B 1/7174 |
| | | | 375/147 |
| 2011/0138317 A1 | 6/2011 | Kang et al. | |
| 2011/0256895 A1* | 10/2011 | Palin | H04M 1/72412 |
| | | | 382/106 |
| 2012/0001875 A1* | 1/2012 | Li | G06F 3/017 |
| | | | 345/177 |
| 2012/0062595 A1* | 3/2012 | Oh | G06V 30/142 |
| | | | 345/633 |
| 2015/0087331 A1 | 3/2015 | Yang et al. | |
| 2015/0133051 A1 | 5/2015 | Jamal-Syed et al. | |
| 2016/0205501 A1* | 7/2016 | Lee | H04W 12/40 |
| | | | 455/457 |
| 2017/0026798 A1 | 1/2017 | Prevatt | |
| 2017/0142606 A1 | 5/2017 | Lee et al. | |
| 2017/0250831 A1* | 8/2017 | Aldana | G01S 5/0009 |
| 2017/0356979 A1 | 12/2017 | Georgiou et al. | |
| 2018/0036640 A1* | 2/2018 | Drakoln | G06T 11/60 |
| 2018/0120561 A1 | 5/2018 | Liu et al. | |
| 2018/0124552 A1* | 5/2018 | Cho | H04W 4/80 |
| 2019/0037351 A1 | 1/2019 | Prevatt | |
| 2019/0068529 A1 | 2/2019 | Mullins | |
| 2021/0241537 A1 | 8/2021 | Ahn | |
| 2022/0201428 A1* | 6/2022 | Ertan | G06F 21/44 |

FOREIGN PATENT DOCUMENTS

| | | |
|---|---|---|
| JP | 2017-223645 | 12/2017 |
| JP | 6468656 | 2/2019 |
| KR | 10-2011-0118421 | 10/2011 |
| KR | 10-2017-0056315 | 5/2017 |
| KR | 10-2017-0074563 | 6/2017 |
| KR | 10-2018-0120164 | 11/2018 |
| KR | 10-2020-0027153 | 3/2020 |

OTHER PUBLICATIONS

International Search Report for PCT/KR2021/008546 mailed Nov. 14, 2021, 4 pages.
Written Opinion of the ISA for PCT/KR2021/008546 mailed Nov. 14, 2021, 5 pages.
Korean Office Action dated Mar. 11, 2024 for KR Application No. 10-2020-0107208.

* cited by examiner

Device selection in the communication link

METHOD AND APPARATUS FOR RECOGNIZING TARGET DEVICE, FOR AUGMENTED REALITY

CROSS-REFERENCE TO RELATED APPLICATIONS

This application is a continuation of International Application No. PCT/KR2021/008546, designating the United States, filed on Jul. 6, 2021, in the Korean Intellectual Property Receiving Office, and claiming priority to Korean Patent Application No. 10-2020-0107208 filed on Aug. 25, 2020, in the Korean Intellectual Property Office, the disclosures of all of which are hereby incorporated by reference herein in their entireties.

BACKGROUND

Field

Various example embodiments relate to a method and/or apparatus whereby an electronic device can increase the recognition accuracy of a target device among surrounding external devices in augmented reality (AR).

Description of Related Art

Recently, research and development are being conducted on expended reality (XR) technologies such as virtual reality (VR), augmented reality (AR) and/or mixed reality (MR). Recently, VR, AR and/or MR technologies have been used in various fields (e.g., entertainment, infotainment, smart home and/or smart factory). In this respect, electronic devices for these technologies are continuously being researched and developed in hardware and/or software. For example, a wearable glass device (e.g., AR glasses or smart glasses), a head-mounted device (e.g., a head mounted display (e.g., an HMD), or a smartphone is used alone or in conjunction with at least two or more devices, thereby providing one video by superimposing (or overlaying) various digital contents (e.g., virtual images) on the real world using applications related to the AR service through a display.

According to an embodiment, for the AR service, it is able to recognize which target device corresponds to a device to where the AR device is recognized on the screen of the display among various external devices (or peripheral devices) recognized on the data communication link operatively connected between devices through a communication module. For example, the AR devices are be able to specify distance information and direction information on the external devices with high accuracy on the data communication link.

However, in a typical indoor environment, the data communication link between the AR device and the target device may be physically formed through multi-path. As a result, there is a problem in that an accuracy in specifying the distance and direction of the target device may be lowered in the indoor environment. For example, in the indoor environment, an accuracy of an angle of arrival (AoA) estimation may be low on the data communication link subject to the influence of the multi-paths. In general, in the angle of arrival estimation, a precision may be improved in proportion to the number of antennas of the electronic device. For example, in case that the number of antennas is large compared to the number of the multi-paths, it may be possible to approximately estimate the angle of arrival with reliability. In general, in the indoor environment, the data communication link may be formed through a very large number of multi-paths, and thus a very large number of antennas may be required for the angle of arrival estimation. However, it may be difficult to implement a large number of antennas in case of the electronic devices that is subject to various limitations such as a power consumption, design, size, and/or weight.

SUMMARY

In various example embodiments, for recognizing the target device in augmented reality (AR), a method and/or apparatus capable of estimating the distance and direction of the target device with high precision on the data communication link may be provided.

In various example embodiments, a method and/or apparatus capable of increasing the accuracy of angle of arrival estimation using distance information and direction information on the target object (e.g., actual target device) recognized on the AR screen of the display of the electronic device to estimate distance information and direction information on the target device on the data communication link may be provided.

An electronic device according to an example embodiment may include: a display module comprising a display, a camera module comprising a camera, a communication module comprising communication circuitry, and a processor, including processing circuitry, operatively connected to the camera module, the display module, and the communication module, in which the processor may be configured to: transmit an image obtained through the camera module to an external device through the communication module; receive an augmented reality (AR) image including at least one object from the external device through the communication module; display the augmented reality (AR) image through the display module; recognize a target object from among the at least one object; and map one of peripheral devices found on a data communication link through the communication module to a target device corresponding to the recognized target object.

An electronic device according to an example embodiment may include: a display module, a camera module, a communication module, and a processor operatively connected, directly or indirectly, to the camera module, the display module, and the communication module, in which the processor may be configured to: transmit an image obtained through the camera module to an external electronic device through the communication module; receive an augmented reality (AR) image based on the transmitted image from the external electronic device; display the received AR image through the display module; perform a tab selection based on a distance and direction estimated to a target object on the AR image displayed through the display module; apply a first estimation algorithm using the estimated distance and direction in units of antenna subsets divided based on a plurality of antennas of the communication module; and estimate an angle of arrival (AoA) by applying a second estimation algorithm to outputs obtained by applying the first estimation algorithm to the antenna subsets.

A method for operating an electronic device according to an example embodiment may include: obtaining an image through a camera module of an electronic device; transmitting at least a part of the obtained image to an external electronic device through a communication module; receiving an augmented reality (AR) image including at least one object based on the transmitted image from the external electronic device; displaying the AR image through a display module of the electronic device; recognizing a target object from among the at least one object; and mapping one of peripheral devices found on a data communication link through the communication module to a target device corresponding to the recognized target object.

In various example embodiments to solve one or more of the above described technical objects, a computer-readable recording medium in which a program for executing the method in a processor is recorded may be included.

An additional range of the applicability will become apparent from the following detailed description. However, various alterations and modifications may be clearly understood by those skilled in the art without departing from the spirit and scope of the present disclosure. Accordingly, it should be understood that the detailed description and the specific embodiments such as the exemplary example embodiments are just provided for illustrative purposes.

According to an electronic device and/or an operating method thereof according to various example embodiments, a distance and/or direction of a target device may be estimated with high precision when the electronic device provides an augmented reality (AR) service.

According to various example embodiments, it is possible to accurately estimate distance information and direction information on a target device on a data communication link using distance information and direction information on a target object (e.g., actual target device) recognized on the AR screen of the display of the electronic device.

According to various example embodiments, it is possible to improve an accuracy of an angle of arrival estimation by precisely specifying a distance and direction to a target device in an indoor environment where a data communication link between an electronic device and the target device is physically formed as a multi-path.

According to various example embodiments, an electronic device may be capable of estimating a highly reliable angle of arrival without being limited by the number of antennas (e.g., even in case that the number of antennas is small).

BRIEF DESCRIPTION OF DRAWINGS

In connection with the description of the drawings, the same or similar reference numerals may be used for the same or similar components. The above and other aspects, features and advantages of certain embodiments will be more apparent from the following detailed description, taken in conjunction with the accompanying drawings, in which.

DETAILED DESCRIPTION

Figure 1:
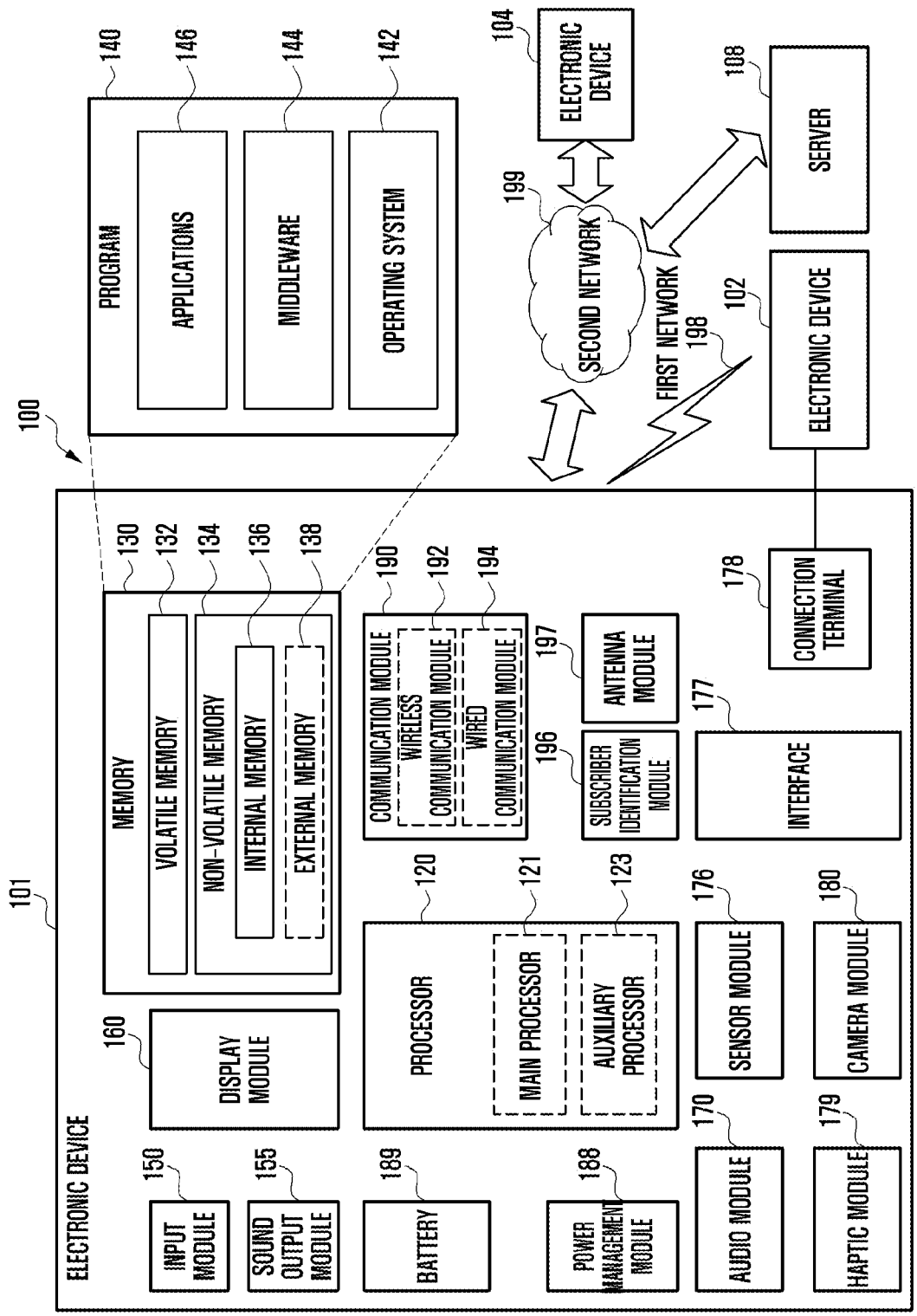
FIG. 1 is a block diagram illustrating an example electronic device in a network environment according to various example embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via at least a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
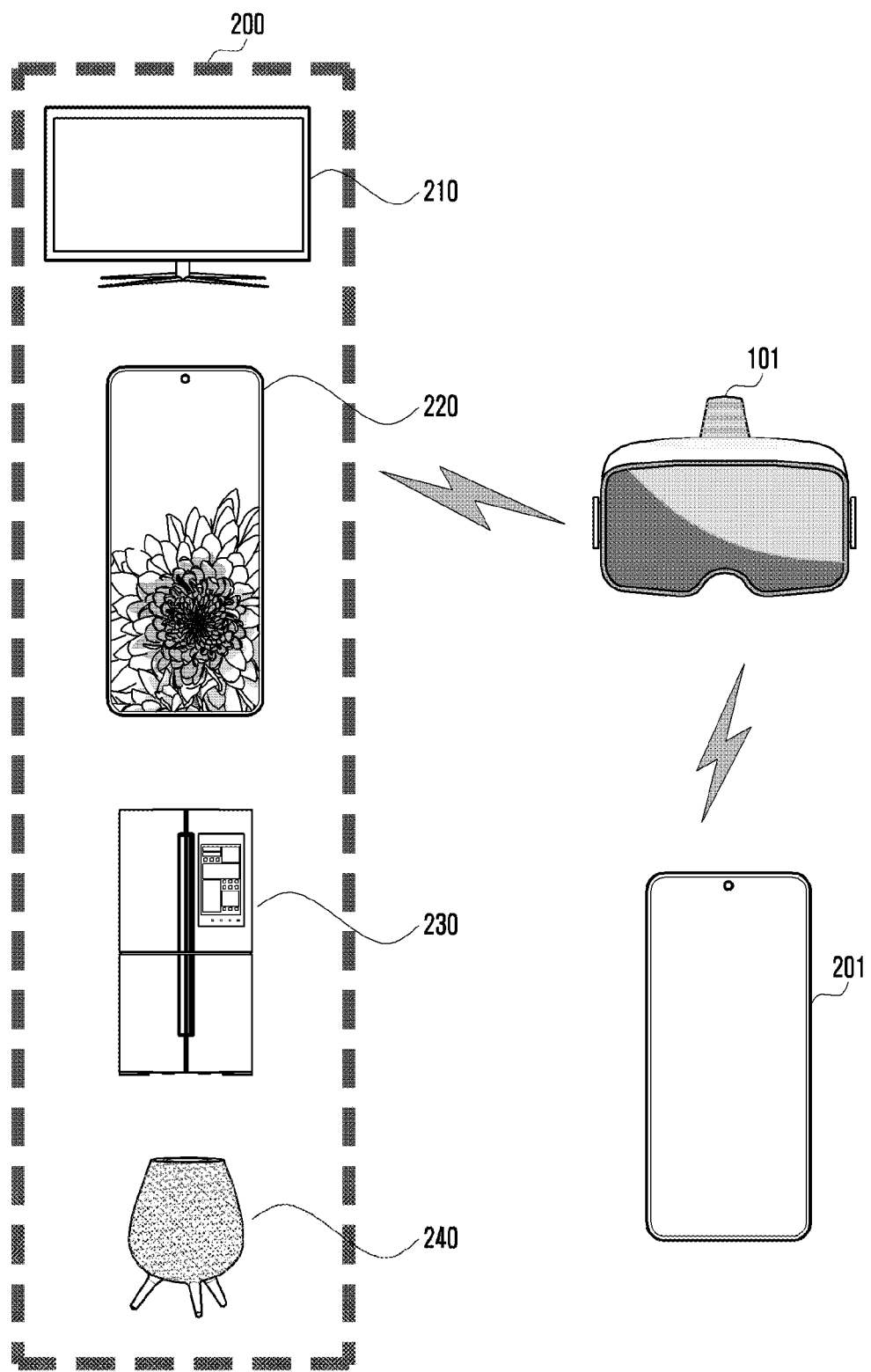
FIG. 2 is a view illustrating an example of an AR system supporting an AR service according to various example embodiments.

FIG. 2 is a view illustrating an example of an AR system supporting an AR service according to various embodiments.

According to an embodiment, FIG. 2 may illustrate an example in which an electronic device 101, an external device 201, and/or a peripheral device 200 (e.g., a first peripheral device 210, a second peripheral device 220, a third peripheral device 230, and/or a fourth peripheral device 240) perform to communicate with each other to support an augmented reality (AR) service. According to an embodiment, not illustrated in FIG. 2, the AR system may further include a server (or cloud) (not illustrated) (e.g., a server 108 of FIG. 1).

As illustrated in FIG. 2, the electronic device 101 according to an embodiment may include, for example, AR glasses, smart glasses, a display device, and/or a smart phone.

The peripheral device 200 according to an embodiment may represent, for example, various devices around the electronic device 101 capable of being recognized by the electronic device 101 on the AR. For example, the peripheral device 200 may represent various devices that exist around the electronic device 101, such as the first peripheral device 210 (e.g., TV), the second peripheral device 220 (e.g., smart phone), the third peripheral device 230 (e.g., refrigerator), and/or the fourth peripheral device 240 (e.g., AI speaker).

The external device 201 according to an embodiment may, for example, be included in the peripheral device 200 and include various types of devices having a function of transmitting/receiving data related to the electronic device 101 and the AR service. For example, the external device 201 may include a smart phone, a tablet personal computer (PC), and/or a notebook. According to an embodiment, the external device 201 may perform an operation of a computing host, for example, which is directly generating data (e.g., AR images) related to the AR services (e.g., generated based on stored or processed data) or obtaining the data from a server (e.g., the server 108 of FIG. 1) to provide the data to the electronic device 101.

According to an embodiment, the electronic device 101, the peripheral device 200 and/or the external device 201 may include, for example, all or at least some of the components corresponding to those described in the description with reference to FIG. 1.

According to an embodiment, the electronic device 101 may directly generate data (e.g., AR images) related to the AR services (e.g., generated based on stored or processed data) or obtain the data from the outside (e.g., the external device 201 or server (e.g., cloud)) to display the date through a display (not illustrated). For example, the electronic device 101 is wearable on the user's body (e.g., face) and may overlap various digital contents (e.g., AR images) on the real world to display them as one image (e.g., AR screen) through a display. According to some embodiments, the electronic device 101 may receive related data (e.g., AR image) from the external device 201 and display the received data together with real world data through a display in a tethered AR system.

According to an embodiment, when communicatively connected, directly or indirectly, with the external device 201, the electronic device 101 periodically transmit video information taken through a camera of the electronic device 101 (e.g., a camera module 180 in FIG. 1, including at least one camera) to the external device 201, and/or transmit the video information to the external device 201 in case that state changes (e.g., position or direction change) of the electronic device 101 occur. According to an embodiment, the electronic device 101, when communicatively connected, directly or indirectly, to the external device 201, may provide (e.g., transmit) at least one piece of information such as device information, sensor information, function information, and/or position information to the external device 201. According to an embodiment, the external device 201 or server (e.g., the server 108 of FIG. 1) may generate data (e.g., AR image) related to video information and transmit the video information to the electronic device 101 based on video information, device information, sensor information, function information and/or position information transmitted by the electronic device 101.

According to an embodiment, the electronic device 101 may search for additional information on the peripheral device 200 to display the additional information through a display or perform to interact with a virtual object on the AR screen. For example, the electronic device 101 may be worn by a user, confirm device information related to the peripheral device 200 on the AR, and select a specific device (e.g., target device) on the AR to perform a control according to a specific command (e.g., control command) According to an embodiment, the electronic device 101 may recognize the peripheral device 200 on the AR and confirm related information and transmit a command that responds according to a user's intention to the peripheral device 200, thus to provide an AR service.

According to an embodiment, the electronic device may transmit/receive data with the peripheral device 200 and/or external device 201 using WLAN communication such as Wi-Fi and/or Wi-Gig.

According to an embodiment, in the environment as illustrated in FIG. 2, for the AR service, the electronic device 101 may be able to recognize which target device corresponds to a target object (e.g., a target device in the real world) recognized on the AR screen provided through the display among the several peripheral devices 200 recognized (or found) on a data communication link operatively connected between devices through a communication module comprising communication circuitry. For example, the electronic device 101 may be able to specify distance information and direction information with high accuracy with respect to the peripheral device 200 on the data communication link. For example, it may be difficult to specify a distance and direction to the target device with high accuracy in an indoor environment where the data communication link between the electronic device 101 and the target device is physically formed through a multi-path.

In various embodiments, the electronic device 101 may improve a recognition rate and accuracy of distance information and direction information of the target device on the data communication link, for the AR service in which the electronic device 101 recognizes the target device on the AR, confirms information related to the target device, and transmits the corresponding command to the target device.

According to an embodiment, the electronic device 101 may improve an accuracy of angle of arrival (AoA) estimation using distance information and direction information on the target object recognized on the AR screen (e.g., an object corresponding to an actual target device in the real world) to estimate distance information and direction information on the target device on the data communication link. According to an embodiment, the electronic device 101 may provide a highly reliable angle of arrival estimation without being limited by the number of antennas provided in the electronic device 101 (e.g., even in case that the number of antennas is small).

According to various embodiments, the electronic device 101 may transmit an image obtained through the camera module 180 of the electronic device 101 to the external device 201, and receive an AR image including at least one object from the external device 201 through a communication module 190. According to an embodiment, the electronic device 101 may display the AR image received from the external device 201 through a display module 160 comprising a display.

According to an embodiment, the electronic device 101 may recognize the target object from among at least one object on the received AR image, and estimate a distance and direction to the recognized target object. According to an embodiment, the electronic device 101 may map one of the peripheral devices 200 found on the data communication link through the communication module 190 (comprising communication circuitry) to a target device corresponding to the recognized target object.

According to an embodiment, the electronic device 101 may provide a hybrid method of angle of arrival estimation based on the estimated distance and direction to the target object on the AR image displayed through the display module 160 (comprising a display), by performing: a tab selection operation (e.g., selecting a channel impulse response (CIR) tab); a first angle of arrival estimation operation (e.g., a first operation) for the target device using a first estimation algorithm related to an angle of arrival estimation; and a second angle of arrival estimation operation (e.g., a second operation) using a second estimation algorithm related to an angle of arrival estimation for an estimation result obtained by performing the first angle of arrival estimation operation.

Hereinafter, the estimation of the angle of arrival in the electronic device 101 according to various embodiments will be described.

Figure 3:
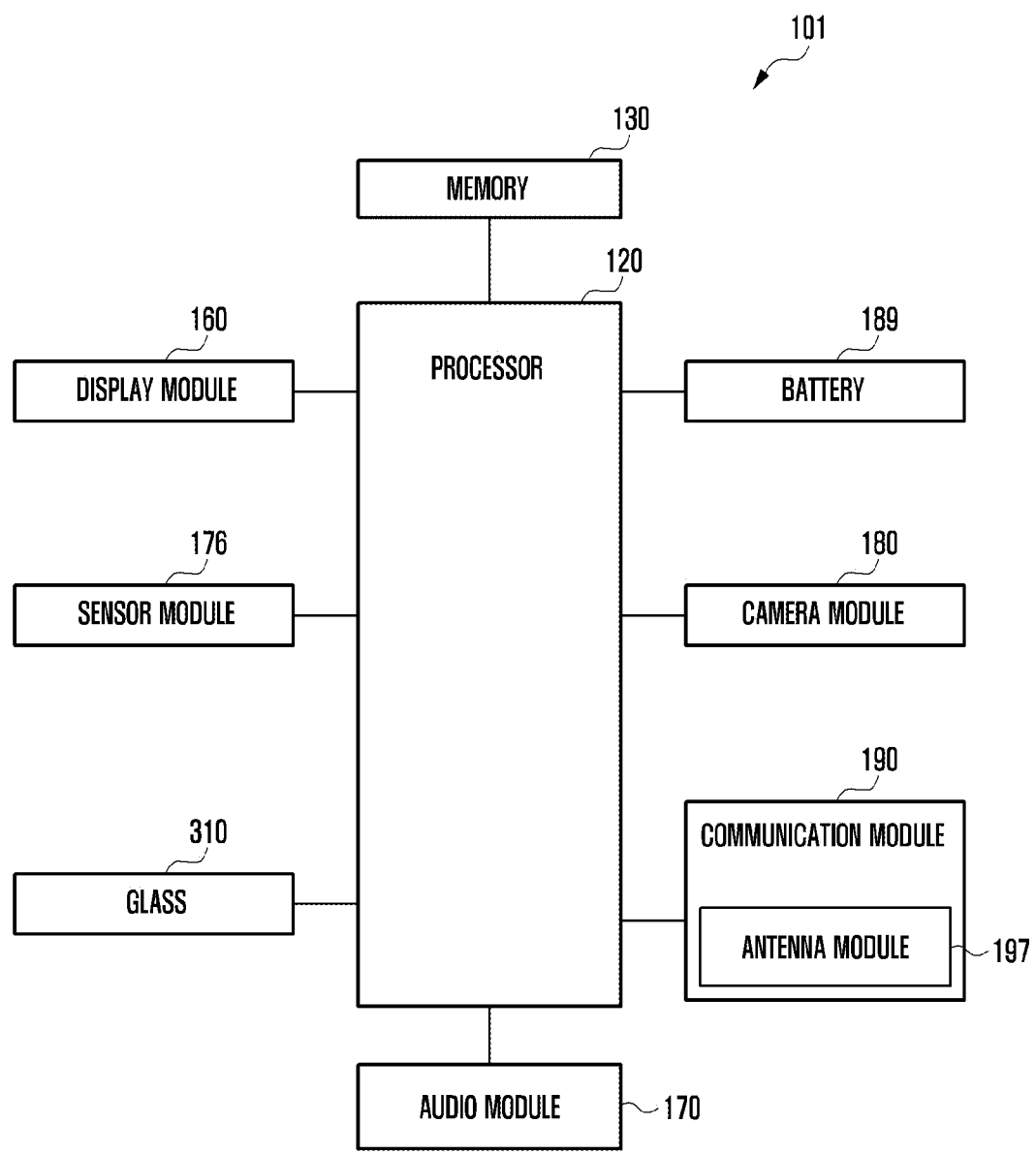
FIG. 3 is a block diagram schematically illustrating a constitution of an electronic device according to various example embodiments.

FIG. 3 is a block diagram schematically illustrating a constitution of an electronic device according to various embodiments.

According to an embodiment, FIG. 3 may illustrate an example of a constitution related to supporting an AR service in the electronic device 101 according to various embodiments. According to an embodiment, the electronic device 101 illustrated in FIG. 3 may include all or at least some of the components of the electronic device 101 as described in the description with reference to FIG. 1. According to an embodiment, in FIG. 3, the electronic device 101 may represent an AR device (e.g., AR glasses or smart glasses).

Referring to FIG. 3, the electronic device 101 may include a processor 120, display module 160 comprising a display, sensor module 176 comprising at least one sensor, glass 310, battery 189, camera module 180 comprising at least one camera, communication module 190 comprising communication circuitry, memory 130, and audio module 170 comprising audio circuitry.

According to an embodiment, the components included in the electronic device 101 may be understood as, for example, hardware modules (e.g., circuitry). According to an embodiment, the components included in the electronic device 101 may not be limited by the components illustrated in FIG. 3 (e.g., the display module 160, sensor module 176, glass 310, battery 189, camera module 180, and/or communication module 190). For example, the components of the electronic device 101 illustrated in FIG. 3 may be omitted, replaced with other components, or additional components may be added. For example, the glass 310 may be included in case that the electronic device 101 is AR glasses and/or smart glasses, and may not be included in case that the electronic device 101 is a smart phone.

According to an embodiment, the glass 310 may include a condensing lens and/or a transparent waveguide. For example, the transparent waveguide may be positioned at least partially on a part of the glass 310. According to an embodiment, light emitted from the display module 160 may be incident through one end of the glass 310 and the incident light may be transmitted to a user through the waveguide formed in the glass 310. The waveguide may be made of glass or polymer, and may include a nanopattern formed on one surface inside or outside the waveguide, for example, a polygonal or curved grating structure. According to an embodiment, the incident light may be propagated or reflected inside the waveguide and transmitted to the user.

According to an embodiment, the display module 160 may include a plurality of panels (or display areas), and the plurality of panels may be positioned on the glass 310.

According to an embodiment, at least a part of the display module 160 may be constituted of a transparent element, and the user may penetrate through the display module 160 to perceive a real space on the rear surface of the display module 160. According to an embodiment, the display module 160 may display a virtual object on at least a partial area of the transparent element so that the user sees that the virtual object is added to at least a part of the real space. According to an embodiment, in case that the display module 160 is a transparent uLED, the constitution of the waveguide within the glass 310 may be omitted.

According to an embodiment, the sensor module 176 may include a proximity sensor, an illuminance sensor, and/or a gyro sensor. According to an embodiment, the proximity sensor may detect an object adjacent to the electronic device 101. According to an embodiment, the illuminance sensor may measure the degree of brightness around the electronic device 101. According to an embodiment, the processor 120 may confirm the brightness level around the electronic device 101 using the illuminance sensor, and change brightness-related setting information of the display module 160 based on the brightness level. For example, when the ambient brightness is brighter than a predetermined brightness, the processor 120 may set the brightness level of the display module 160 higher so as to increase the user's visibility. According to an embodiment, the gyro sensor may detect a posture and position of the electronic device 101. For example, the gyro sensor may detect whether the electronic device 101 is properly worn on the user's head. For another example, the gyro sensor may detect a motion of the electronic device 101 or a motion of the user wearing the electronic device 101.

According to an embodiment, the communication module 190 may include an antenna module 197 comprising at least one antenna. For example, the communication module 190 may support various technologies (e.g., beamforming) for securing performance in a designated frequency band, multiple input/output (MIMO), and/or an array antenna. According to an embodiment, the antenna module 197 may transmit or receive signals or power to or from the outside (e.g., the peripheral device 200 and/or the external device 201). According to an embodiment, the antenna module 197 may include a plurality of antennas (e.g., an array antenna). According to an embodiment, a signal or power may be transmitted or received between the communication module 190 and the external peripheral device 200 and/or the external device 201 through the antenna module 197.

According to an embodiment, the memory 130 may correspond to the memory 130 as described in the description with reference to FIG. 1. According to an embodiment, the memory 130 may store various data used by the electronic device 101 when the electronic device 101 provides the AR service. The data may include, for example, input data or output data for software (e.g., a program 140), and commands related thereto.

According to an embodiment, the audio module 170 may convert sound into an electrical signal or conversely convert an electrical signal into sound based on the control of the processor 120.

According to an embodiment, the processor 120 may correspond to the processor 120 as described in the description with reference to FIG. 1. According to an embodiment, the processor 120, for example, may execute an application (e.g., an AR application), thus to control the peripheral device 200 connected to the electronic device 101 through the data communication link on the AR and to perform various data processing or calculations related to the AR service. According to an embodiment, as at least part of the data processing or calculations, the processor 120 may store the data received through the communication module 190 in the memory 130, process the data stored in the memory 130, and store and/or transmit resulting data to the peripheral device 200 (e.g., the target device). Each "processor" herein comprises processing circuitry.

According to an embodiment, the processor 120 may control the display module 160 to display one image (e.g., AR screen) by overlapping various digital contents (e.g., AR images) on the real world provided through the application related to the AR service. According to an embodiment, the processor 120 may estimate first information (e.g., distance and direction) between the target object (e.g., corresponding to the target device (e.g., the peripheral device) in the real world) and the electronic device 101 on the AR screen. According to an embodiment, the electronic device 101 may include various sensors (e.g., the sensor module 176 and the camera module 180), and the processor 120 may measure the distance and direction to the target object based on sensing information using at least one sensor.

According to an embodiment, the electronic device 101 may include at least one sensor, such as an infrared sensor, a time-of-flight (ToF) sensor (or a ToF camera), an AR camera, and/or a next-generation AR camera (e.g., a lidar sensor), and the processor 120 may output a designated signal (e.g., infrared light, light source, laser) toward a subject (e.g., the target device) using a corresponding sensor, and measure the time for the output signal to be reflected from the subject and returned, thus to estimate the distance and direction to an image (e.g., the target object) provided through the AR screen.

According to an embodiment, the processor 120 may perform an operation of a channel impulse response (CIR) tab selection using the target object and the estimated first information (e.g., distance and direction) on the AR screen. According to an embodiment, wireless communication has a time varying channel, and the processor 120 may perform an operation of selecting at least one tab from CIR that varies with time. For example, the processor 120 may perform the operation of the CIR tab selection based on the estimated first information in order to reduce (or minimize or alleviate) the influence of multi-path as a first operation for an angle of arrival estimation. For example, processor 120 may select a tab (e.g., tab of interest) to use for the angle of arrival estimation based on the first information, in responses that vary with different delays in many multi-paths. According to an embodiment, the first operation of the angle of arrival estimation will be described with reference to the drawings described below in relation to the CIR tab selection operation.

According to an embodiment, the processor 120 may group a plurality of antennas of the antenna module 197 into a specified number based on the first information (e.g., distance and direction). According to an embodiment, the processor 120 may separate (or divide) the plurality of antennas (e.g., an array antenna) of the antenna module 197 into a plurality of antenna subsets. For example, one antenna may be included in the plurality of subsets. For example, some of the antennas included in the plurality of antenna subsets may overlap.

According to an embodiment, the processor 120 may perform a second operation for the angle of arrival estimation based on at least a part of the first information (e.g., distance information and/or direction information) estimated through an image (e.g., the target object) provided through an AR screen with respect to the antenna subset. For example, the processor 120 may use the direction information estimated on the image to perform the first angle of arrival estimation based on the first estimation algorithm designated among the angle of arrival estimation algorithms for the angle of arrival estimation.

According to an embodiment, the angle of arrival estimation algorithms capable of using in the electronic device 101, for example, may include various estimation algorithms, such as a classic method, which is parametric spectrum estimation, minimum or small variance distortionless response (MVDR) method, a multiple signal classification (MUSIC) method, and/or a minimum norm method. In an embodiment, for example, the MDVR method may be used as the first angle of arrival estimation algorithm in a second operation for the angle of arrival estimation. For example, the processor 120 may use at least a part of the first information and apply the MVDR method to the antenna subset to perform the second operation for the angle of arrival estimation.

The MVDR method according to an embodiment may represent, for example, an example of a beamforming-based angle of arrival estimation method. According to an embodiment, the MVDR method, for example, may represent a method of performing the angle of arrival estimation by applying a weight vector capable of amplifying a signal received from a specific direction, measuring the signal level, and estimating whether there is the signal from the specific direction.

According to an embodiment, the processor 120 may suppress signal components received in other directions based on a correlation matrix between each antenna of the antenna module 197 when setting the weight vector in the beamforming-based MVDR method. For example, the processor 120 may process (or generate) the signal components received in other directions as noise. According to an embodiment, the processor 120 may obtain (or generate) an estimation result (e.g., output) corresponding to each antenna subset as a result of performing the second operation on the antenna subset based on the first angle of arrival estimation algorithm.

According to an embodiment, a general MVDR method may be a representative method of the beamforming-based angle of arrival estimation method. For example, for a path component incident in the angle "θ" direction, the weight vector (w) by MVDR may be expressed as in Equation 1 below, and the angle of arrival estimation may be performed in a multi-path environment by applying weight vectors for all possible directions (θ) to measure the magnitude of the signal components.

$$W_{MVDR,\theta} = \frac{a(\theta R_H^{-1}}{a^H(\theta)R_H^{-1}a(\theta)} \quad \text{[Equation 1]}$$

The example expressed in Equation 1 may represent a general equation for the general MVDR. In the example of Equation 1, $R_H$ may represent a correlation matrix between antenna components, H may represent a conjugate transpose operation, θ may represent an incident angle, and a(θ) may represent a phase difference according to the incident angle (θ).

Figure 9:
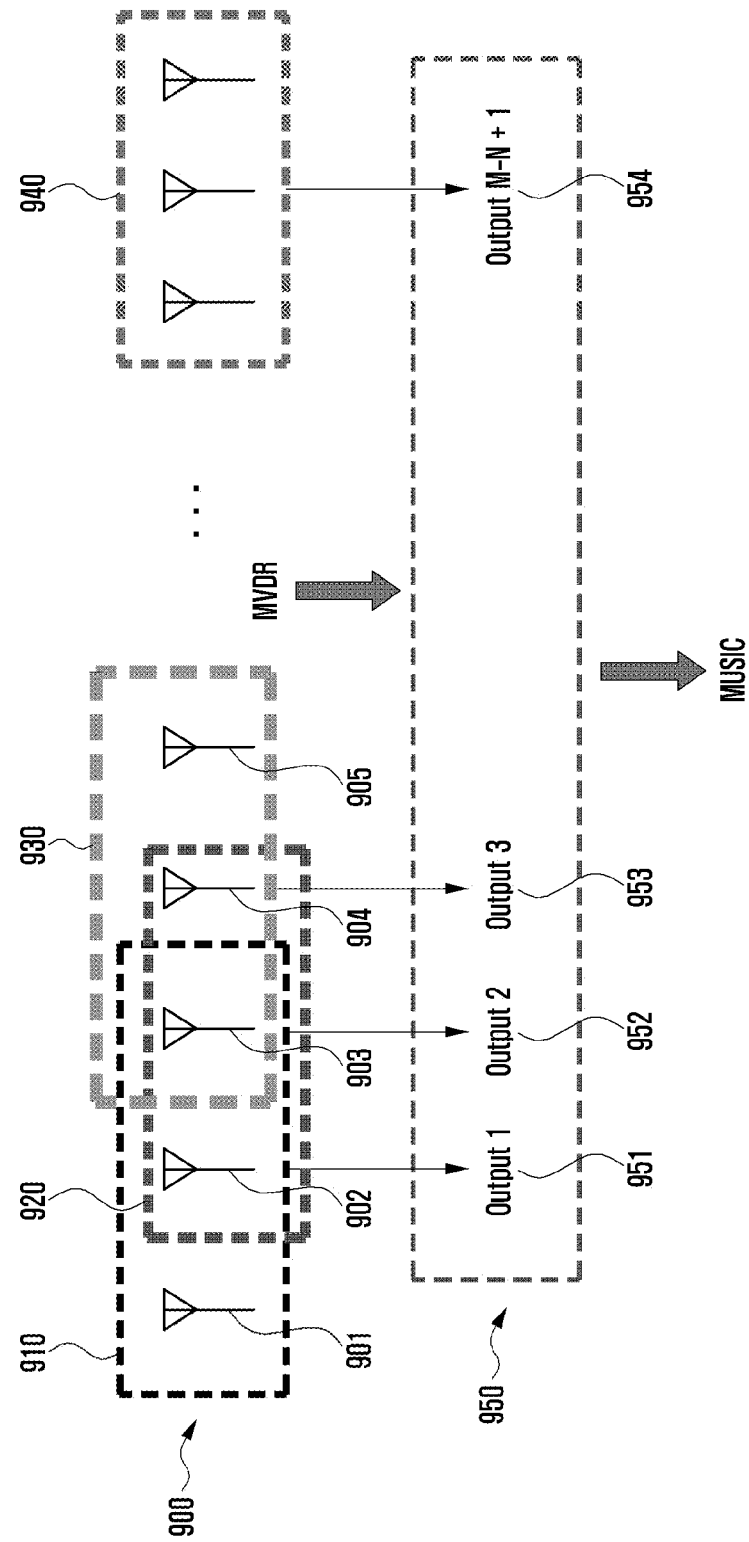
FIG. 9 is a view illustrating an example of constituting antenna subsets in the electronic device according to various example embodiments.

According to an embodiment, a hybrid angle of arrival estimation according to an example embodiment may be performed by applying (or modifying) the general MVDR method as described above. For example, a modified MVDR method used in the hybrid angle of arrival estimation according to an example embodiment may be based on the general MVDR method, but process multi-path components (or components) that deviate from a direction of interest (e.g., an angle of interest) as noise, thereby favoring the subsequent angle of arrival estimation operation described below. For example, in the general MVDR method since a combining is performed by applying a weight vector to the entire antennas, one output may be resulted. As a result, the output dimension (e.g., the sum of weight vectors) may be "1". Therefore, a dimension larger than a signal subspace is required in the subsequent angle of arrival estimation operation. In this respect, it is impossible to apply the general MVDR method to the subsequent angle of arrival estimation operation. Therefore, the MVDR method may be applied to the hybrid angle of arrival estimation according to an example embodiment in units of overlapping antenna subsets, as illustrated in FIG. 9 described below. For example, the modified MVDR method used in the hybrid angle of arrival estimation according to an example embodiment may be defined as in Equation 2 below.

$$W_{MVDR,\theta}^m = \frac{a_{m:m+M-1}(\theta) R_{H_{m:m+M-1}}^{-1}}{a_{m:m+M-1}H(\theta) R_{H_{m:m+M-1}}^{-1} a_{m:m+M-1}(\theta)}$$ [Equation 2]

According to an example embodiment, for example, the example expressed in Equation 2 may represent that the plurality of antennas (e.g., array antenna) of the antenna module 197 is divided into a plurality of antenna subsets to apply the MVDR method in units of antenna subsets. For example, according to an example embodiment, the example expressed in Equation 2 may represent an equation corresponding to the $m^{th}$ antenna subset in case that the plurality of antennas are divided into antenna subsets by overlapping at least one antenna based on a designated direction to apply the MVDR method. In the example of Equation 2, M represents the number of antennas in each antenna subset, a represents a steering vector for a direction of arrival estimation of a signal, the subscript "m:n" (e.g., where m is the start point and n is the end point) may indicate a slicing from the $m^{th}$ antenna subset (e.g., starting point) to the $n^{th}$ (e.g., n=m+M−1) antenna subset (e.g., the ending point) among the entire vector components.

For example, as expressed in Equation 2, the weight vector may be divided and determined for overlapping antenna subsets determined in a manner similar to applying a sliding window. Referring to Equation 2, in case of the $m^{th}$ antenna subset, M×K channel matrix is given by $H_{m:m+M-1}$. Here, a subscript (e.g., m:m+M−1) may represent a slicing (H) into rows having an index range from m to m+M−1. Then, the MVDR weight vector for the $m^{th}$ antenna subset for the angle (θ) is obtained, thereby given as in Equation 2.

According to an embodiment, when applying all antenna subsets (e.g., m=1, 2, . . . , N−M+1), each antenna subset may generate a single weighted sum and the resulting dimension may be determined by the number of antenna subsets (e.g., N−M+1). According to an embodiment, when applying a weight vector ($W_{MVDR,\theta_I}^m$) by assuming that the angle of interest found from the image is defined as $\theta_I$, multi-path components incident deviating from the angle of interest (e.g., $\theta_I$) may be suppressed.

According to some embodiments, the component incident at a predetermined angle may have residual components at neighboring angles under an angle of arrival estimation of a finite dimension. In this case, when simply applying the weight vector) ($W_{MVDR,\theta_I}^m$), the angle of arrival estimation may be weak for the residual components generated by the multi-path components incident at angles far from the angle of interest (e.g., $\theta_I$).

Therefore, in the angle of arrival estimation according to an example embodiment, as in Equation 3 and the example of FIG. 10 described below, the sum of the MVDR weight vectors for upper and lower margin angles, in addition to the angle of interest, may be applied. For example, Equation 3 below may represent an example of summing the steering vectors by performing the same operation as Equation 2 for the desired angle (e.g., the direction of interest), boundary angle 1 (e.g., an upper boundary), and boundary angle 2 (e.g., a lower boundary), respectively.

$$W_{MVDR,\theta_I}^m + W_{MVDR,\theta_U}^m + W_{MVDR,\theta_L}^m$$ [Equation 3]

In the example of Equation 3, $\theta_U$ may represent a margin corresponding to the upper boundary (e.g., an upper boundary angle), and $\theta_L$ may represent a margin corresponding to the lower boundary (e.g., a lower boundary angle). For example, $\theta_U$ and $\theta_L$ may each be provided with a predetermined margin (e.g., $\theta_I \pm \theta_{margin}$) with respect to a margin (e.g., $\theta_{margin}$). For example, an output provided by a weighted sum of components incident at the angle of interest and their upper and lower margin angles may be generated. For example, after weight vectors are set for at least three directions of the angle of interest, an upper limit direction corresponding to the upper boundary, and a lower limit direction corresponding to the lower boundary, the sum of weight vectors corresponding to the three directions may be determined as a final weight vector to be applied in each antenna subset.

According to an embodiment, an operation using the MVDR method as the second operation of angle of arrival estimation will be described with reference to drawings to be described below (e.g., FIGS. 9 and 10).

According to an embodiment, the processor 120 may perform a third operation for the angle of arrival estimation based on an estimation result estimated by the second operation. For example, the processor 120 may perform the second angle of arrival estimation based on a designated second estimation algorithm among the angle of arrival estimation algorithms for the angle of arrival estimation with respect to the estimation result corresponding to the antenna subset. In an embodiment, for example, the MUSIC method may be used as the second angle of arrival estimation algorithm in a third operation for the angle of arrival estimation. For example, the processor 120 may apply the MUSIC method to each output corresponding to the antenna subset to perform the third operation of the angle of arrival estimation.

The MUSIC method according to an embodiment, for example, may be used to perform the angle of arrival estimation by separating a subset by signal components and a subspace by noise. For example, in, the subspace separation may be performed by performing an eigenvalue decomposition on the correlation matrix with the MUSIC method, and separate subspaces may have properties to be perpendicular to each other. For example, the processor 120 may apply the MUSIC method to each output corresponding to the antenna subset to separate a signal and noise from each output. According to an embodiment, an operation using the MUSIC method as the third operation of angle of arrival estimation will be explained with reference to the drawings described below. According to an embodiment, the processor 120 may specify the distance and direction to the target device on the data communication link based on the second angle of arrival estimation result of the third operation. For example, the processor 120 may estimate the angle of arrival with respect to the target device on the data communication link using a result of performing the first operation, the second operation, and the third operation.

An electronic device 101 according to various example embodiments includes: a display module 160, a camera module 180, a communication module 190, and a processor 120 operatively connected, directly or indirectly, to the camera module 180, the display module 160, and the communication module 190, in which the processor 120 may be configured to: transmit an image obtained through the camera module 180 to an external device through the communication module 190; receive an augmented reality (AR) image including at least one object from the external device through the communication module 190; display the augmented reality (AR) image through the display module 160; recognize a target object from among the at least one object; and map one of peripheral devices (example: the peripheral device 200 in FIG. 2) found on the data communication link through the communication module 190 to a target device corresponding to the recognized target object.

According to various example embodiments, the processor 120 may be configured to estimate a distance and direction to the target object on the AR image, identify whether a signal transmitted from the target device on the data communication link is received from the estimated distance and direction, and map the target object and the target device in case that the signal transmitted from the target device is received from the estimated distance and direction.

According to various example embodiments, the processor 120 may be configured to perform a first operation for an angle of arrival (AoA) estimation for the target device by applying a designated first estimation algorithm, and perform a second operation for the angle of arrival estimation by applying a second estimation algorithm designated based on an estimation result according to the performing of the first operation.

According to various example embodiments, the processor 120 may be configured to perform a channel impulse response (CIR) tab selection based on the signal transmitted from the target device.

According to various example embodiments, the processor 120 may be configured to select a tab of interest to be used for the angle of arrival estimation from among a plurality of tabs sampled at a predetermined interval for the signal.

According to various example embodiments, based on the distance estimated on the AR image, the tab of interest may include a tab which corresponds to a value obtained by dividing the corresponding distance by a speed of an electromagnetic wave.

According to various example embodiments, the processor 120 may be configured to generate a plurality of outputs by applying the first estimation algorithm to the tab of interest, and apply the second estimation algorithm to the plurality of outputs.

According to various example embodiments, the first estimation algorithm may include an algorithm for estimating a signal in a specific direction by beamforming, and the second estimation algorithm may include an algorithm for separating a designated signal and noise.

An electronic device 101 according to various example embodiments includes: a camera module 180, a display module 160, a communication module 190, and a processor 120 operatively connected, directly or indirectly, to the camera module 180, the display module 160, and the communication module 190, in which the processor 120 may be configured to: transmit an image obtained through the camera module 180 to an external electronic device through the communication module 190; receive an augmented reality (AR) image from the external electronic device based on the transmitted image; display the received augmented reality (AR) image through the display module 160; perform a tab selection based on a distance and direction estimated to a target object on the AR image displayed through the display module 160; apply a first estimation algorithm using the estimated distance and direction in units of antenna subsets divided based on a plurality of antennas of the communication module 190; and estimate an angle of arrival (AoA) by applying a second estimation algorithm to an output obtained by applying the first estimation algorithm to the antenna subset.

According to various example embodiments, the first estimation algorithm may include an algorithm for estimating a signal in a specific direction by beamforming, and the second estimation algorithm may include an algorithm for separating a designated signal and noise.

According to various example embodiments, the processor 120 may be configured to recognize the target object on the image obtained through the camera module 180 and displayed through the display module 160, and estimate a distance and direction to the recognized target object.

According to various example embodiments, the processor 120 may be configured to select a tab corresponding to the estimated distance and direction on the image as a tab of interest to be used for the angle of arrival estimation among a plurality of tabs sampled at a predetermined interval.

According to various example embodiments, the processor 120 may be configured to provide the selected tab of interest as an input for applying the first estimation algorithm.

According to various example embodiments, the processor 120 may be configured to generate the antenna subset including a designated number of antennas based on the plurality of antennas.

According to various example embodiments, the processor 120 may be configured to generate the antenna subset by overlapping at least one antenna in each of the antenna subsets to have a maximum or large number of antenna subsets.

According to various example embodiments, the processor 120 may be configured to generate a plurality of outputs corresponding to the number of antenna subsets by applying the first estimation algorithm to the antenna subsets.

According to various example embodiments, the processor 120 may be configured to apply the second estimation algorithm to the plurality of outputs.

According to various example embodiments, the processor 120 may be configured to separate eigenvectors constituting a signal subspace and eigenvectors constituting a noise subspace for the plurality of outputs, and complete the angle of arrival estimation based on the signal subspace.

Hereinafter, an operating method of the electronic device 101 according to various embodiments will be described in detail. According to various embodiments, operations performed by the electronic device 101 described below may be executed by the processor 120 including at least one processing circuitry of the electronic device 101. According to an embodiment, operations performed by the electronic device 101 may be executed by instructions that are stored in the memory 130 and allow the processor 120 to be operated when executed.

Figure 4:
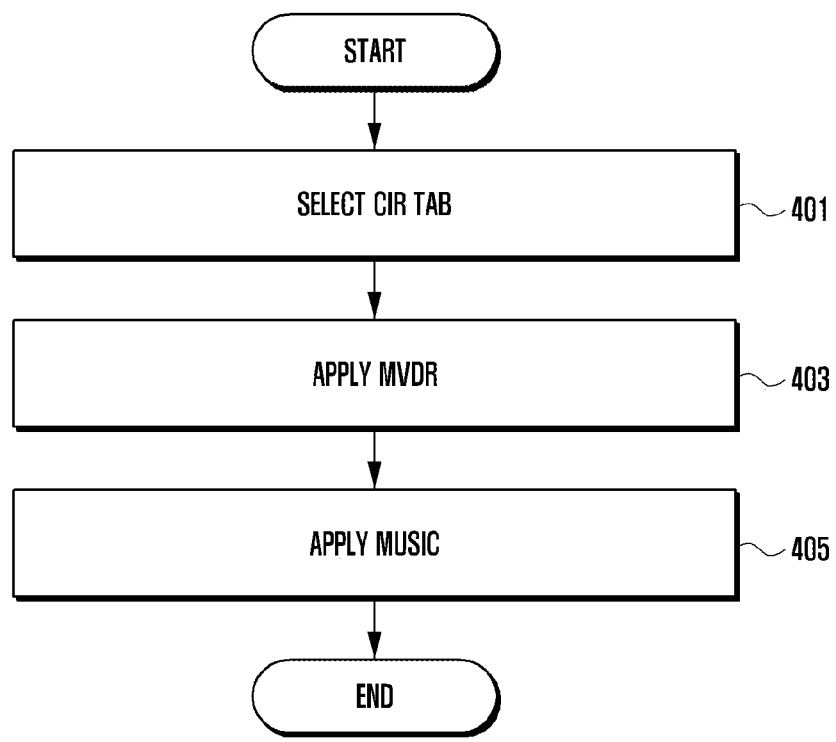
FIG. 4 is a flowchart illustrating an operation of the electronic device according to various example embodiments.

FIG. 4 is a flowchart illustrating an operation of an electronic device according to various embodiments.

Referring to FIG. 4, in operation 401, the processor 120 of the electronic device 101 may perform a CIR tab selection operation to reduce the influence of multi-path as a first operation for an angle of arrival estimation. According to an embodiment, the processor 120 may perform a CIR tab selection using a distance and direction estimated for a specific object (e.g., target device) on an image obtained through the camera module 180 and displayed through the display module 160. According to an embodiment, CIR may be determined depending on which delay component an impulse transmitted from a transmitting end (e.g., target device) is received with in a time domain of a receiving end (e.g., the electronic device 101). For example, CIR may occur separately depending on a delay of each multi-path according to the propagation time of the corresponding path. This will be described with reference to FIGS. 5 to 8 described below.

At operation 403, the processor 120 may perform the first angle of arrival estimation based at least in part on the estimated distance and direction to a specific object on the image using the first estimation algorithm (e.g., MVDR) as the second operation for the angle of arrival estimation According to an embodiment, the processor 120 may separate (or divide) antennas (e.g., array antennas) of the antenna module 197 into an antenna subset including a designated number of antennas, and apply MVDR to each antenna subset using the estimated direction on an image. According to an embodiment, the processor 120 may obtain a plurality of output results by applying MVDR to the antenna subsets.

In operation 405, The processor 120 may perform the second angle of arrival estimation using the second estimation algorithm (e.g., MUSIC) based on the output results corresponding to the antenna subset as the third operation for the angle of arrival estimation. According to an embodiment, the processor 120 may apply MUSIC to the plurality of output results obtained by applying MVDR to the antenna subsets.

FIGS. 5 to 8 are views for explaining an operation example of CIR tab selection applied to the electronic device according to various embodiments.

Figure 5:
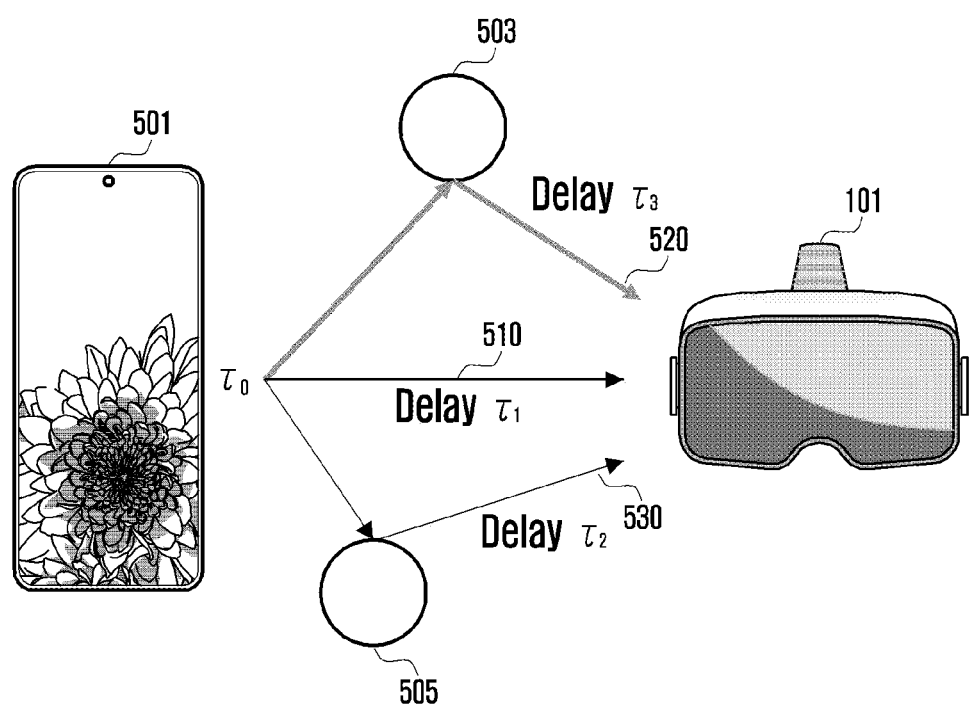
FIG. 5 is a view illustrating an operation example for CIR tab selection applied in the electronic device according to various example embodiments.
Figure 6:
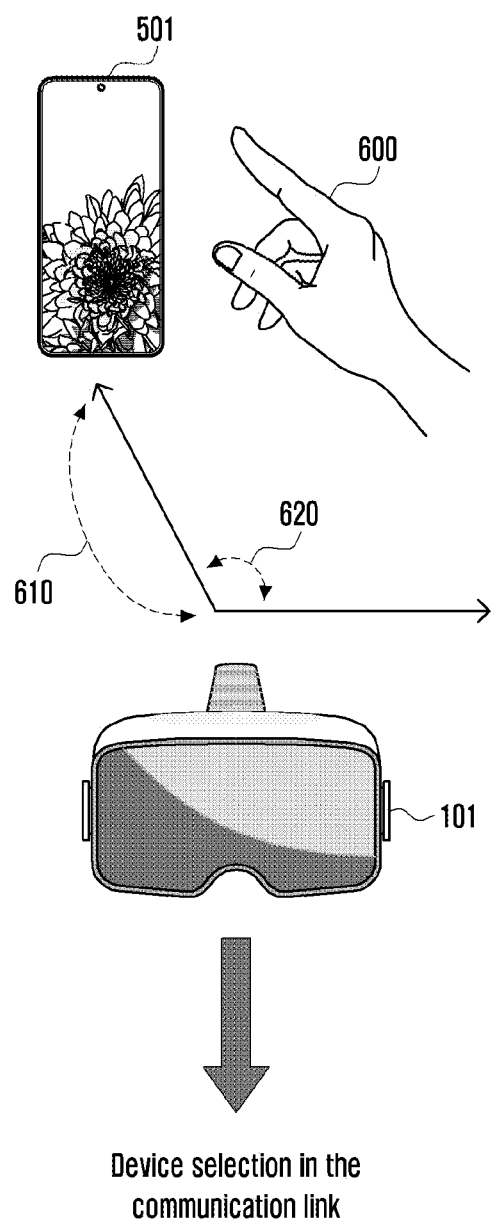
FIG. 6 is a view illustrating an operation example for CIR tab selection applied in the electronic device according to various example embodiments.

According to an embodiment, FIG. 5 is a view for explaining CIR in the electronic device 101. According to an embodiment, FIG. 6 is a view for explaining an example of recognizing a target device 501 in the electronic device 101.

According to an embodiment, as the data communication link between the electronic device 101 and the target device 501 is formed by multi-path, the precision of the angle of arrival estimation may decrease. Therefore, it is necessary to basically reduce the influence of multi-path as much as possible in order to increase the precision of angle of arrival estimation.

FIG. 5 may illustrate an example of estimating CIR in a channel estimation operation for data decoding in case that the electronic device 101 receives a signal (e.g., signal transmitted at $\tau_0$) transmitted by the target device 501 (e.g., at least some of the peripheral device 200). According to an embodiment, CIR may be determined depending on which delay (e.g., Delay $\tau_1$, Delay $\tau_2$, or Delay $\tau_3$) an impulse transmitted from a transmitting end (e.g., the target device 501) is received with in a time domain of a receiving end (e.g., the electronic device 101). For example, as illustrated in FIG. 5, in an indoor environment, a signal may be transmitted from the target device 501 to the electronic device 101 using multi-path, such as a first path 510 in which the signal is directly transmitted from the target device 501 to the electronic device 101, a second path 520 and a third path 530 in which the signal is transmitted from the target device 501, reflected by peripheral reflectors 503 and 505 (e.g., walls, columns, or other peripheral devices) and transmitted to the electronic device 101, and each path of the multi-path may be separately generated depending on a delay (e.g., Delay $\tau_1$, Delay $\tau_2$, or Delay $\tau_3$) according to the propagation time of the corresponding path.

According to an embodiment, an ideal impulse form of CIR may theoretically be obtained from a signal transmitted between the electronic device 101 and the target device 501 using an infinite bandwidth. According to another embodiment, in case that a finite bandwidth is used between the electronic device 101 and the target device 501, each path spreads left and right in CIR, and thus multi-path may not be completely separated (or divided). For example, Table 1 below illustrates the difference in minimum propagation distance between dividable multi-path in CIR according to the bandwidth of various communication systems.

TABLE 1

| | Bandwidth | | | |
|---|---|---|---|---|
| | 20 MHz (WLAN) | 80 MHz (WLAN) | 500 MHz (UWB) | 2.14 GHz (WiGig) |
| Resolution | 7.5 m | 1.9 m | 37.5 cm | 6.94 cm |

As illustrated in Table 1, as the bandwidth increases (e.g., 20 MHz→2.14 GHz), a multi-path with a small propagation distance difference may be divided. For example, in case of WLAN, when using the bandwidth of about 80 MHz, a multi-path with a propagation distance difference of about 1.9 m may be divided, and in case of UWB, when using the bandwidth of about 500 MHz, a multi-path with a propagation distance difference of about 37.5 cm may be divided.

According to various embodiments, the electronic device 101 may precede the CIR tab selection operation (e.g., the first operation for the angle of arrival estimation) to reduce the influence of multi-path as illustrated in FIG. 5. For example, the electronic device 101 may map the target object (e.g., the target device 501) recognized on the image and the target device 501 corresponding to the target object among the peripheral devices 200 found on the data communication link. According to an embodiment, the electronic device 101 may determine the target device 501 (or select the target device 501) to map the target object and the target device 501 using the distance information and direction information recognized from the target object on the image and based on whether a signal from a specific device (e.g., the target device 501) on the data communication link is being received from the distance and direction recognized on the image.

According to an embodiment, the electronic device 101 may perform the angle of arrival estimation based on the signal from the determined target device 501. According to some embodiments, as illustrated in FIG. 6, the electronic device 101 may determine an object indicated by a user (e.g., selected by the user's hand 600 or eye tracking on the AR) as a target object among the objects corresponding to the peripheral devices 200 provided on the AR, and recognize the distance information and direction information on the determined target object.

According to an embodiment, as illustrated in FIG. 6, in the first operation of the angle of arrival estimation (e.g., the first operation), the electronic device 101 determines the target device 501 on the data communication link using distance information (e.g., a distance 610) and direction information (e.g., an angle 620) recognized based on the target object on the image, and performs the CIR tab selection based on a signal transmitted from the determined target device 501, thereby primarily minimizing or reducing the influence of multi-path. For example, based on the distance information (e.g., the distance 610) and direction information (e.g., the angle 620) recognized on the image, the electronic device 101 may determine the target device 501 based on determining that a signal received from a specific device on the data communication link is within a designated range of the distance information and direction information recognized on the image.

Figure 7:
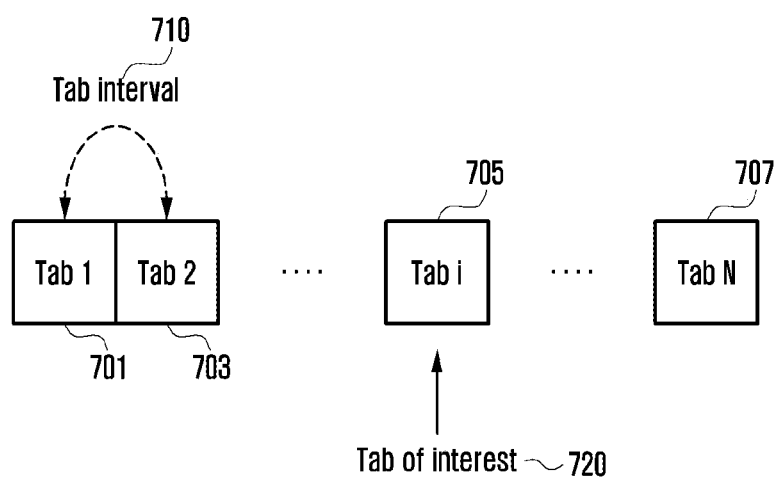
FIG. 7 is a view illustrating an operation example for CIR tab selection applied in the electronic device according to various example embodiments.

According to an embodiment, FIG. 7 is a view for explaining an example of an operation of performing the CIR tab selection in the electronic device 101.

According to an embodiment, since the communication system operates based on sampling, the CIR described with reference to FIG. 5 may be given in a sampled form at a predetermined tab interval 710. According to an embodiment, the tab interval 710 may represent orthogonal frequency division multiplexing (OFDM) sampling time or symbol time. For example, referring to FIG. 7, $Tab_1$ 701 may be given as a first sampled value (or sampling data), $Tab_2$ 703 may be given as a second sampled value, Tab i 705 may be given as an $i^{th}$ sampled value, and Tab N 707 may be given as a $N^{th}$ sampled value.

According to an embodiment, the electronic device 101 may select a tab of interest 720 (e.g., Tab i 705) to be used for the angle of arrival estimation among a plurality of tabs 701 to 707 sampled at a predetermined interval as described above. According to an embodiment, the electronic device 101 may select the interest tab 720 based on Equation 4 below.

$$\text{Tab of interest} = \frac{\text{distance}}{\text{velocity of light}} \quad \text{[Equation 4]}$$

For example, as expressed in Equation 4, the electronic device 101 may select, as the tab of interest 720, a tab corresponding to a value obtained by dividing the distance by the speed of the electromagnetic wave, based on the distance recognized on the image. According to an embodiment, the electronic device 101 may alleviate the influence of multi-path by performing the angle of arrival estimation in the next operation (e.g., the second operation) using the tab of interest 720 selected as described above. For example, the selected tab of interest 720 may be provided as an input for the angle of arrival estimation.

Figure 8:
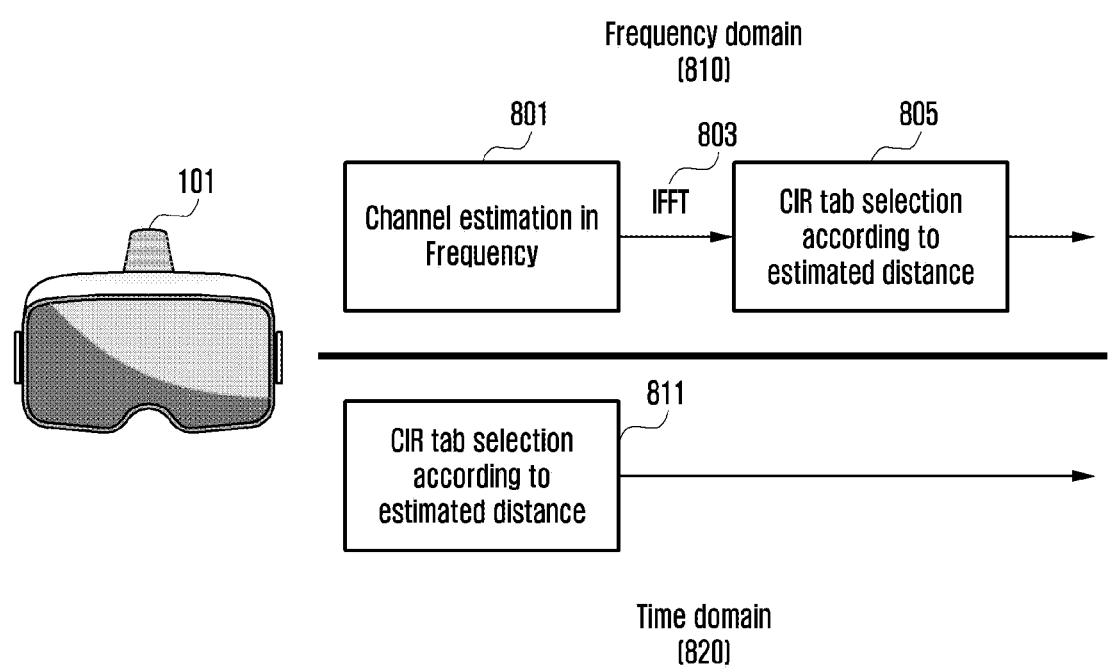
FIG. 8 is a view illustrating an operation example for CIR tab selection applied in the electronic device according to various example embodiments.

According to an embodiment, FIG. 8 is a view for explaining an example of the CIR tab selection operation in another type of communication system. For example, FIG. 8 may illustrate an example in which the CIR tab selection is performed in various communication systems.

As illustrated in FIG. 8, the channel estimation may be classified into, for example, a case in which the channel estimation is performed in a frequency domain 810 or a case in which the channel estimation is performed in a time domain 820.

According to an embodiment, the electronic device 101 may perform the channel estimation in the frequency domain 810 in a multi carrier (e.g., OFDM) based communication system of 802.11ax. For example, the electronic device 101 may switch to the time domain 820 by applying an inverse fast fourier transform (IFFT) 803 to a channel estimation result 801 performed in the frequency domain. According to an embodiment, the electronic device 101 may switch to the time domain and then perform a CIR tab selection 805 according to the estimated distance.

According to an embodiment, the electronic device 101 may be performed directly in the time domain 820 in a single carrier (e.g., single carrier frequency division multiple access (SC-FDMA)) based communication system of 802.11 ay. For example, the electronic device 101 may perform a CIR tab selection 811 according to the estimated distance without a separate domain switch.

The electronic device 101 may perform the second operation related to the angle of arrival estimation with respect to the selected tab (e.g., the tab of interest 720) after performing the CIR tab selection corresponding to the above description.

For example, the electronic device 101 may partially alleviate the influence of multi-path primarily based on the CIR tab selection operation. However, in the general communication system using a bandwidth of about tens or hundreds of MHz, the resolution or resolving power of a path in CIR may not be high. Therefore, the influence of multi-path may remain even after the CIR tab selection. The electronic device 101 according to various embodiments, after the CIR tab selection, may improve the precision of angle of arrival estimation by sequentially performing the second operation based on the first estimation algorithm (e.g., MVDR) and the third operation based on the second estimation algorithm (e.g., MUSIC) and using the advantages of estimation algorithms for the angle of arrival estimation.

According to an embodiment, the MUSIC method used for the angle of arrival estimation may have high estimation precision, but may have high precision in case that the number of multi-path is smaller than the number of antennas. According to another embodiment, the MVDR method used for the angle of arrival tracking may not have high precision, but may form a beam (e.g., beamforming) so that components other than a specific direction are processed like noise. Therefore, when the MVDR method is applied to the direction of interest (e.g., the direction corresponding to the target object) extracted from the image, components other than the corresponding direction may be processed like noise, thereby reducing an effective dimension of a signal subspace. Therefore, in case that the effective dimension is reduced through beamforming using the MVDR method and then the MUSIC method is applied, the high-precision angle of arrival estimation may be performed for the direction of interest.

According to various embodiments, the electronic device 101, for the tab of interest (e.g., the direction of interest or the angle of interest) estimated on the image by the CIR tab selection operation (e.g., the first operation for the angle of arrival estimation), may apply the first estimation algorithm (e.g., MVDR) to reduce the effective dimension by processing components other than the tab of interest (e.g., components in directions other than the direction of interest) as noise (e.g., the second operation for the angle of arrival estimation), then apply the second estimation algorithm (e.g., MUSIC) with relatively high estimation precision, thereby performing the angle of arrival estimation with high precision for the direction of interest.

FIG. 9 is a view illustrating an example of constituting an antenna subset in an electronic device according to various embodiments. FIG. 10 is a view for explaining an example of setting an area of interest based on the direction of interest according to various embodiments.

According to an embodiment, FIG. 9 may illustrate an example of dividing a plurality of antennas of the antenna module 197 into antenna subsets to apply the first estimation algorithm in the second operation for the angle of arrival estimation. According to an embodiment, the MVDR method is used as the first estimation algorithm and the MUSIC method is used as the second estimation algorithm to assist in understanding of the present disclosure, but various embodiments are not limited thereto. The MVDR method calculates a weight vector to be applied to the entire antennas of the electronic device 101. However, when combining is performed by applying the weight vector to the entire antennas, one output may be resulted, thus the output dimension becomes '1' and the MUSIC method may not be applied thereafter.

Therefore, in various embodiments, instead of applying MVDR to the entire antennas, as illustrated in FIG. 9, the entire antennas may be divided into several antenna subsets, and the MVDR method may be applied in units of antenna subsets. For example, the electronic device 101 may divide a plurality of antennas into antenna subsets based on designated directions. Antennas included in one antenna subset may be antennas disposed in the electronic device 101 and being close to each other.

Referring to FIG. 9, the electronic device 101 may include a plurality of antennas (e.g., M antennas, M is the number of antennas), and divide a plurality of antennas into a plurality of antenna subsets 900 (e.g., a first antenna subset (910), a second antenna subset (920), a third antenna subset (930), a $N^{th}$ antenna subset (940)) including a designated number of antennas (e.g., N, where N is the number of antenna subsets for applying MVDR).

According to an embodiment, each antenna subset 910, 920, 930, and 940 may include a designated number of antennas (e.g., three antennas in case of FIG. 9), and have at least one antenna which is included in antenna subsets adjacent to each other. For example, the third antenna 903 may be included in the first antenna subset 910, the second antenna subset 920, and the third antenna subset 930. For example, antennas included in the antenna subsets 910, 920, 930, and 940 may be partially overlapped.

For example, since the dimensions (or output dimensions) may be proportional to the number of antenna subsets 910, 920, 930, and 940 (e.g., equal to the number of antenna subsets) after MVDR is applied to the antenna subsets 910, 920, 930, and 940, the number of antenna subsets 910, 920, 930, and 940 need to be increased to increase the number of dimensions. In various embodiments, a plurality of antennas may be divided into the designated number of antenna subsets 910, 920, 930, and 940 (e.g., N, where N is the number of antennas included in the antenna subsets 910, 920, 930, and 940 for applying MVDR). For example, the electronic device 101 may increase the dimension by designating a group so that one antenna belongs to several antenna subsets in the form of a sliding window.

According to an embodiment, it may be assumed that the total number of antennas of the electronic device 101 is M, and N antennas (e.g., three antennas) belong to each antenna subset 910, 920, 930 and 940. For example, as illustrated in FIG. 9, the first antenna subset 910, the second antenna subset 920, and the third antenna subset 930 may be described as examples. The first antenna subset 910 may include a first antenna 901, a second antenna 902, and a third antenna 903, the second antenna subset 920 may include the second antenna 902, the third antenna 903, and a fourth antenna 904, and the third antenna subset 930 may include the third antenna 903, the fourth antenna 904, and a fifth antenna 905. In this example, the electronic device 101 may generate the antenna subsets 910, 920, 930, and 940 in which at least one antenna overlaps with each other in the form of a sliding window, sequentially apply MVDR in units of antenna subsets 910, 920, 930 and 940, and generate outputs 950 (e.g., output 1 951, output 2 952, output 3 953, . . . , output M−N+1 954) corresponding to the antenna subsets 910, 920, 930 and 940, respectively. For example, as in the example of FIG. 9, the total number of antennas is M, in case of generating antenna subsets 910, 920, 930 and 940 including N antennas in each antenna subset 910, 920, 930 and 940, the output dimension may be expressed as M−N+1 when MVDR is applied in units of antenna subsets 910, 920, 930 and 940.

According to an embodiment, the MVDR method sets a weight vector for a specific direction (θ). In various embodiments, the weight vector may be set in units of antenna subsets.

Figure 10:
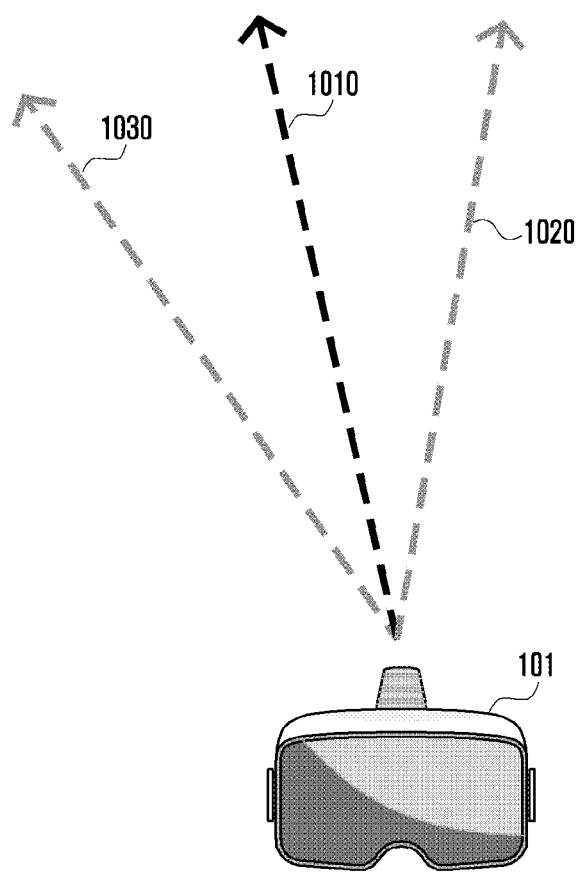
FIG. 10 is a view for explaining an example of setting an area of interest based on a direction of interest according to various example embodiments.

According to an embodiment, the electronic device 101, as illustrated in FIG. 10, may set an area of interest to perform high-precision angle of arrival estimation on the basis of a direction of interest (or an angle of interest) 1010. For example, the direction of interest 1010 may represent the direction of the target device 501 estimated (or recognized) from the target object on the image, the area of interest may represent an upper boundary (e.g., an upper boundary angle) and a lower boundary (e.g., a lower boundary angle) in which a predetermined margin is set on the basis of the corresponding direction of interest 1010.

For example, the electronic device 101 may set weight vectors for three directions: the direction of interest 1010, an upper limit direction 1020 corresponding to the upper boundary, and a lower limit direction 1030 corresponding to the lower boundary, and determine the sum of weight vectors corresponding to the three directions as a final weight vector to be applied in each antenna subset 910, 920, 930, and 940. An area of direction of interest illustrated in FIG. 10 may be determined on the basis of a designated reference point of the electronic device 101 (e.g., the center point of the camera FOV). For example, on the basis of the direction indicated by the designated reference point of the electronic device 101, a direction of the user's gaze identified through the sensor module 176 or a direction indicated by the user's body identified through the sensor module 176 or the camera module 180 may be set as the area of direction of interest.

According to various embodiments, the electronic device 101 may perform the third operation related to the angle of arrival estimation for the output 950 obtained by applying MVDR to the antenna subsets 910, 920, 930, and 940. According to an embodiment, the electronic device 101 may apply MUSIC to M−N+1 outputs 950 obtained after applying MVDR in units of antenna subsets 910, 920, 930 and 940. For example, the electronic device 101 may separate eigenvectors constituting a signal subspace and eigenvectors constituting a noise subspace by calculating a correlation matrix for M−N+1 outputs 950 and performing an eigenvalue decomposition on the correlation matrix.

As described in FIG. 10, it is possible to estimate whether there is a component incident in the direction of the incident angle θ by measuring the degree to which the possible incident angle θ within the area of interest is perpendicular to the eigenvectors constituting the noise subspace. According to an embodiment, the degree to be perpendicular may be expressed as in Equation 5 below.

$$\text{Degree to be perpendicular} = \frac{1}{a^H(\theta) Q_N Q_N^H a(\theta)} \quad \text{[Equation 5]}$$

In Equation 5, $Q_N$ represents a matrix composed of eigenvectors constituting a noise subspace, H represents a conjugate transpose operation, $\theta$ represents an incident angle, and $a(\theta)$ represents a phase difference according to the incident angle $\theta$.

According to an embodiment, the electronic device 101 may finally complete the angle of arrival estimation by measuring the degree to which the angle of incidence $\theta$ is perpendicular to the matrix $Q_N$ as expressed in Equation 5 and confirming whether the angle $\theta$ (or direction) with the largest value is positioned close to the direction of interest 1010 inside the boundary of the area of interest (e.g., lower boundary and upper boundary). For example, the electronic device 101 may determine, among the peripheral devices 200 (e.g., candidate devices), a device in which a direction having the largest value is set in a direction closest to the direction of interest as the target device recognized on the image.

According to some embodiments, the electronic device 101 may process the angle $\theta$ as being positioned outside the area of interest in case that the angle $\theta$ having the largest value in described above is positioned on the upper boundary and/or lower boundary of the area of interest. For example, in case that the angle $\theta$ is positioned on the upper boundary and/or lower boundary of the area of interest, it may be affected by multi-path incident from a direction outside the area of interest. In this case, the electronic device 101 may determine that the corresponding direction is outside the area of interest, thereby reducing the false detection rate.

Figure 11A:
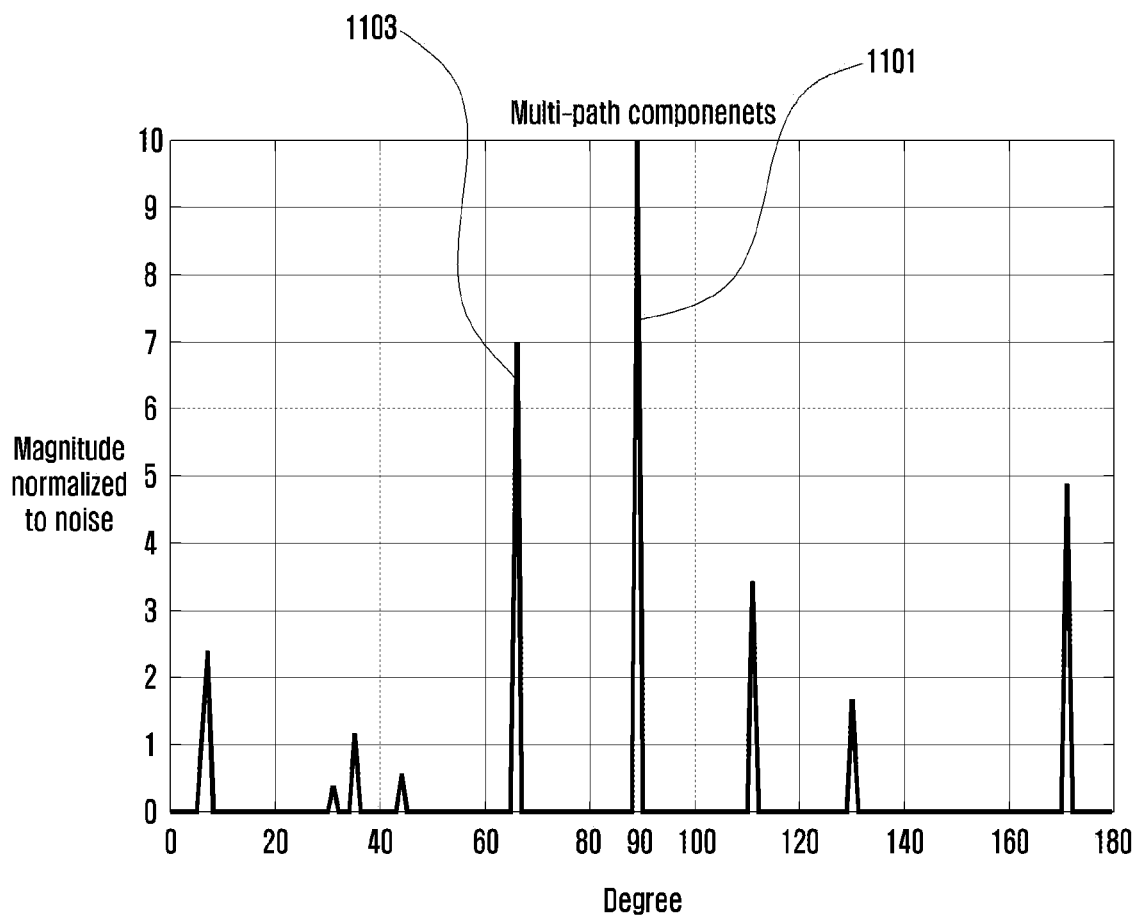
FIGS. 11A and 11B are views for explaining examples of results of angle of arrival estimation in the electronic device according to various example embodiments.
Figure 11B:
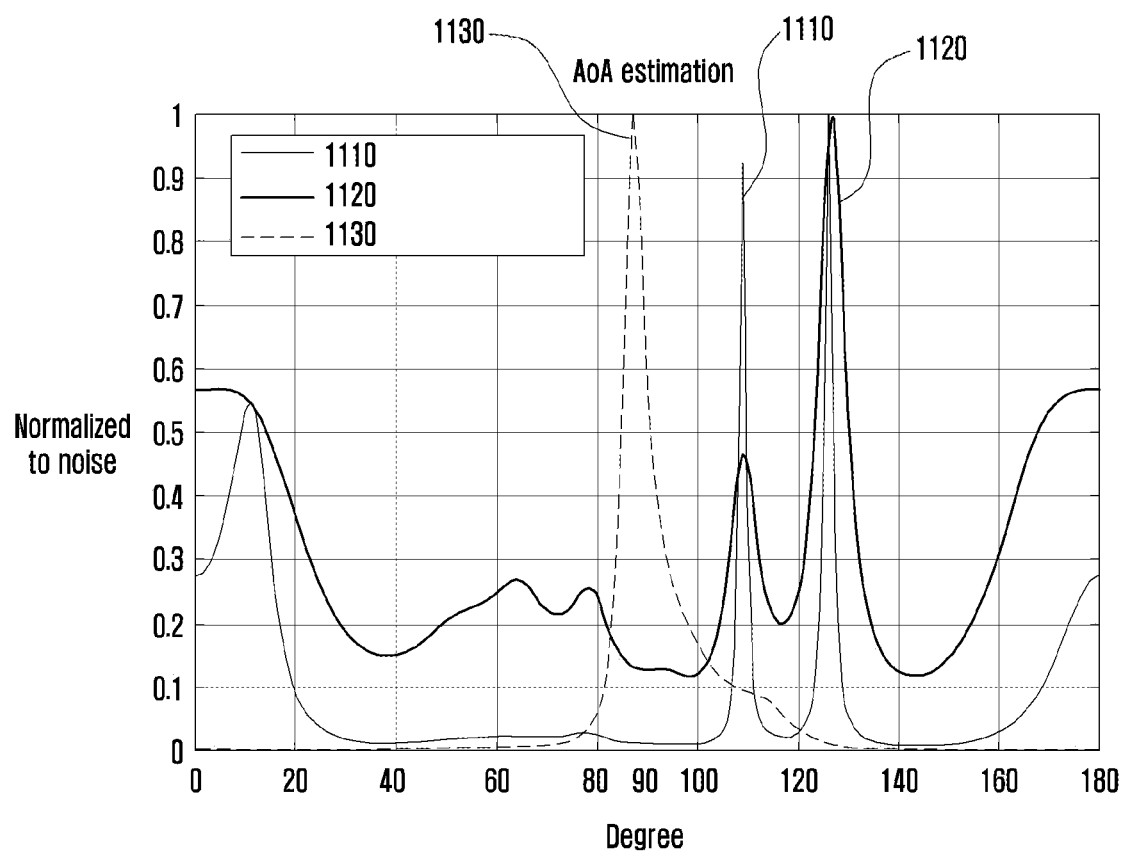

FIGS. 11A and 11B are views for explaining examples of results of angle of arrival estimation in the electronic device according to various embodiments.

According to an embodiment, FIG. 11A may illustrate an example of multi-path components in case that a direction of interest (e.g., a target position) is about at the angle of 90 degrees direction. For example, FIG. 11A may illustrate an example of distribution and size of multi-path components according to angles in a situation (or environment) in which the number of antennas and the number of multi-paths of the electronic device 101 are, for example, ten, respectively. According to an embodiment, FIG. 11B may illustrate examples of an angle of arrival estimation result by MVDR, an angle of arrival estimation result by MUSIC, and a hybrid angle of arrival estimation result according to an example embodiment. For example, FIG. 11B may illustrate examples of results of performing angle of arrival estimation by MVDR 1110, MUSIC 1120, and hybrid 1130 of an example embodiment in the situation as in FIG. 11B.

Referring to FIG. 11A, an element 1101 may represent a primary component (e.g., a path component of a direction of interest), and an element 1103 may represent multi-path components (e.g., path components other than the direction of interest).

Referring to FIG. 11B, as illustrated by the angle of arrival estimation result 1110 by MVDR and the angle of arrival estimation result 1120 by MUSIC, it may be confirmed that the size according to each angle follows the distribution of the multi-path components of FIG. 11A in a similar manner. However, in case of the angle of arrival estimation result 1110 by MVDR and the angle of arrival estimation result 1120 by MUSIC, it may be confirmed that the main line-of-sight (LOS) path (e.g., the shortest distance direction towards the target) positioned in the direction of interest (e.g., the angle of 90 degrees direction) of the primary component 1101 is not normally detected.

For example, in FIGS. 11A and 11B, it may be assumed that the main LOS path is positioned at the angle of 90 degrees direction, and the target device in the corresponding direction is recognized on the image and the angle of 90 degrees direction is set as the direction of interest. In this situation, in case of the hybrid 1130 method of an example embodiment, it may be confirmed that highly sensitive angle of arrival estimation is performed corresponding to the direction of interest when the MVDR 1110 and the MUSIC 1120 are respectively applied to the direction of interest (e.g., the angle of 90 degrees direction). For example, in the situation where the existing MUSIC 1110 or MVDR 1120 does not detect the main LOS path due to the multi-path components, the angle of arrival estimation proposed in an example embodiment may more accurately detect the main LOS path.

Figure 12A:
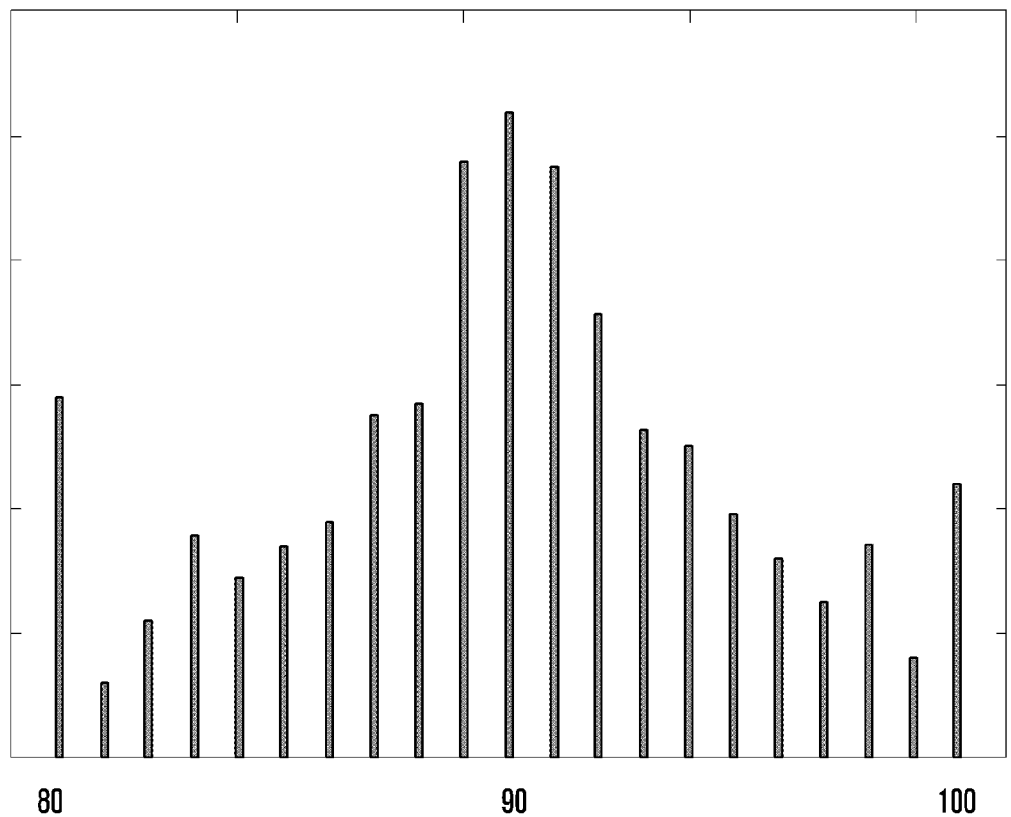
FIGS. 12A and 12B are views for explaining an example of a result of performing angle of arrival estimation based on an area of interest in a specific environment.
Figure 12B:
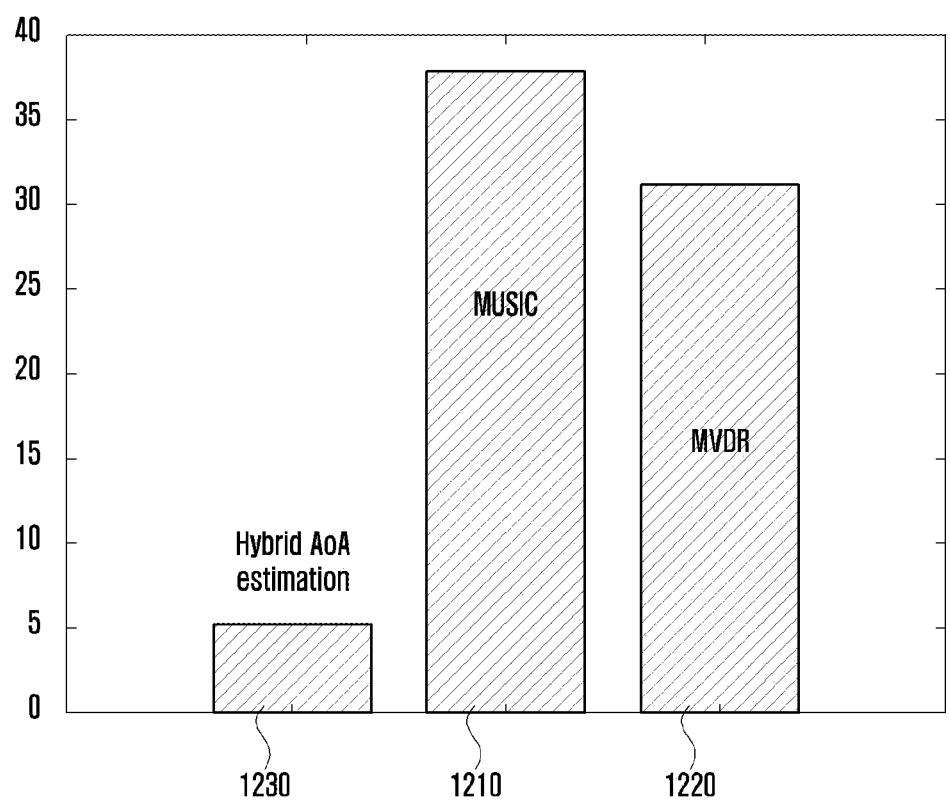

FIGS. 12A and 12B are views for explaining an example of a result of performing angle of arrival estimation based on an area of interest in a specific environment.

According to an embodiment, in the situation as described in FIGS. 11A-11B, FIGS. 12A and 12B may illustrate an example of the result of setting the upper boundary and the lower boundary to a designated angle (e.g., about ±10 degrees) based on the direction of interest (e.g., about the angle of 90 degrees direction), and repeatedly performing the angle of arrival estimation a predetermined number of times.

Referring to FIG. 12A, FIG. 12A illustrates an example of a peak angle distribution, for example, may represent an example of a distribution of directions determined to be most perpendicular to eigenvectors constituting a noise subspace within the area of interest by the angle of arrival estimation according to an example embodiment. As illustrated in FIG. 12A, it may be confirmed that a distribution with a high frequency is formed near the direction of interest (e.g., the angle of 90 degrees direction).

Referring to FIG. 12B, FIG. 12B may illustrate an example of mean square error. As illustrated in FIG. 12B, it may be confirmed that the MUSIC 1210 and the MVDR 1220 generate many errors in the angle of arrival estimation due to the multi-path components. In contrast, it may be confirmed that the hybrid 1230 method according to an example embodiment has a relatively higher precision compared to the MUSIC 1210 and the MVDR 1220.

Figure 13:
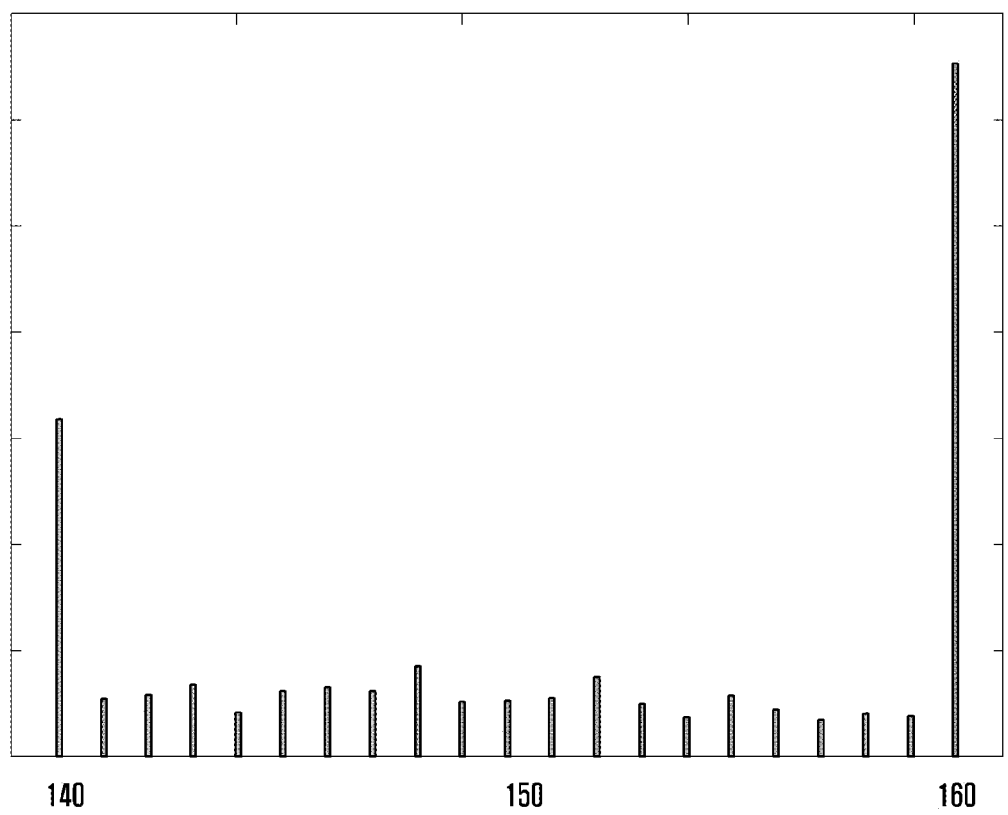
FIG. 13 is a view illustrating a result when a direction of interest and an incident angle are inconsistent according to an example embodiment.

FIG. 13 is a view illustrating a result when the direction of interest and an incident angle are inconsistent according to an embodiment.

Referring to FIG. 13, FIG. 13 may illustrate an example of a peak angle distribution in case of inconsistence between the direction of interest and an actual incident angle. For example, FIG. 13 may illustrate an example of a distribution of directions determined to be most perpendicular within the area of interest given with a ±10 degrees margin (e.g., the upper boundary and lower boundary) in case that the actual main LOS path, for example, is positioned about at the angle of 90 degrees direction in the situation where the direction of interest set from the image is about the angle of 150 degrees. As illustrated in FIG. 13, since the direction of the actual main LOS path exists outside the area of interest, a false detection may be reduced only when the distribution is mainly made at the boundary of the area of interest (e.g., the upper boundary or lower boundary).

Figure 14:
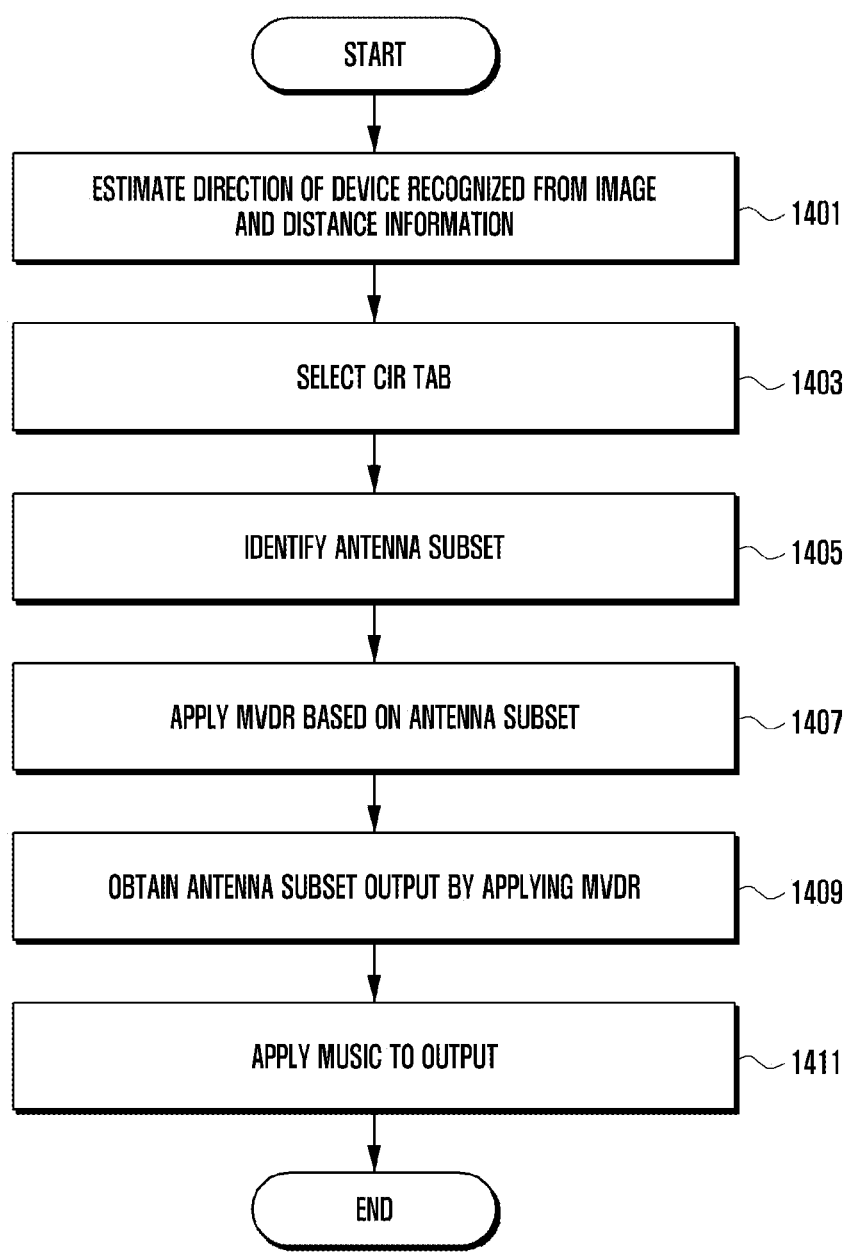
FIG. 14 is a flowchart illustrating an operation of the electronic device according to various example embodiments.

FIG. 14 is a flowchart illustrating an operation of the electronic device according to various embodiments.

According to an embodiment, FIG. 14 may illustrate an example of an operation of performing the hybrid angle of arrival estimation according to an example embodiment in the electronic device 101 according to various embodiments.

Referring to FIG. 14, in operation 1401, the processor 120 of the electronic device 101 may estimate direction information and distance information of a recognized device (e.g., a target device) from an image. According to an embodiment, the processor 120 may estimate the distance and direction of a target object (e.g., an image corresponding to the target device) recognized or designated on the image displayed through the display module 160.

According to an embodiment, the processor 120 may transmit the image obtained through the camera module 180 of the electronic device 101 to an external device (e.g., the external device 201 in FIG. 2) through the communication module 190 of the electronic device 101, and receive an AR image including at least one object from the external device through the communication module 190. According to an embodiment, the processor 120 may display the AR image received from the external device through the display module 160. According to an embodiment, the processor 120 may recognize the target object from among at least one object on the received AR image, and estimate the distance and direction to the recognized target object.

According to an embodiment, the processor 120 may measure the distance and direction to the target object based on sensing information using at least one sensor (e.g., the sensor module 176, the camera module 180) of the electronic device 101. For example, the processor 120 may output a designated signal (e.g., infrared light, light source, laser) toward a subject (e.g., the target device) and may estimate the distance and direction for an image (e.g., the target object) provided through the AR screen by measuring the time for the output signal to be reflected from the subject and returned using at least one sensor such as an infrared sensor, a ToF sensor (or a ToF camera), an AR camera, and/or a next generation AR camera (e.g., a lidar sensor).

In operation 1403, the processor 120 may perform the CIR tab selection. According to an embodiment, the processor 120 may perform the CIR tab selection operation to reduce the influence of multi-path as the first operation for the angle of arrival estimation. According to an embodiment, the processor 120 may perform the CIR tab selection using the estimated distance and direction of a specific object (e.g., the target device) on the image. For example, the processor 120 may select a tab of interest (e.g., the tab 705 of FIG. 7) to be used for the angle of arrival estimation from among a plurality of tabs (e.g., the tabs 701 to 707 in FIG. 7) sampled at a predetermined interval. According to an embodiment, the processor 120 may select a tab corresponding to a value obtained by dividing a corresponding distance by a speed of an electromagnetic wave as the tab of interest, based on the distance recognized on the image. According to an embodiment, the processor 120 may determine the selected tab of interest as an input of the angle of arrival estimation.

In operation 1405, the processor 120 may identify an antenna subset in which a plurality of antennas (e.g., array antennas) of the electronic device 101 are grouped into a designated number. According to an embodiment, the processor 120 may divide the entire antennas of the electronic device 101 into a plurality of antenna subsets and apply MVDR in units of antenna subsets. According to an embodiment, the processor 120 may divide a plurality of antennas into a designated number (e.g., the number of antenna subsets for applying MVDR) of antenna subsets (e.g., the antenna subsets 900 of FIG. 9).

According to an embodiment, the processor 120 may divide the plurality of antennas so that each antenna subset 900 includes a designated number of antennas and have at least one antenna which is included in antenna subsets 900 adjacent to each other. According to an embodiment, the processor 120 may constitute the number of antenna subsets to be maximum or large to increase the number of output results (e.g., output dimensions) to the maximum/large after applying MVDR. For example, the processor 120 may divide the plurality of antennas into the plurality of antenna subsets 900 including a designated number of antennas. For example, the processor 120 may increase the dimensions by designating a group so that one antenna belongs to several antenna subsets in the form of a sliding window.

In operation 1407, the processor 120 may apply the first estimation algorithm (e.g., MVDR) designated based on the antenna subsets 900. According to an embodiment, the processor 120 may apply MVDR to the antenna subsets 900 using the direction estimated on the image. For example, the processor 120 may set the direction of interest using the direction information recognized from the image, and apply MVDR to the antenna subsets grouped for the set direction of interest. According to an embodiment, the processor 120 may sequentially apply MVDR in units of overlapping antenna subsets 900 in the form of a sliding window.

In operation 1409, the processor 120 may obtain outputs (e.g., the outputs 950 of FIG. 9) of the antenna subsets 900 according to the application of the first estimation algorithm. According to an embodiment, the processor 120 may obtain a plurality of output results by applying MVDR to the antenna subsets 900. For example, the processor 120 may generate the output 950 (or output dimension) corresponding to each antenna subset 900. For example, as in the example of FIG. 9, in case that the total number of antennas is M and antenna subsets 900 including N antennas in each antenna subset 900 are generated, the processor 120 may obtain M−N+1 outputs by applying MVDR in units of the antenna subsets 900.

In operation 1411, the processor 120 may apply the designated second estimation algorithm (e.g., MUSIC) to the outputs. According to an embodiment, the processor 120 may complete the angle of arrival estimation by applying MUSIC to the outputs 950 to which the MVDR is applied in units of the antenna subsets 900. According to an embodiment, the processor 120 may apply MUSIC to M−N+1 outputs 950 obtained by applying MVDR in units of antenna subsets 900. For example, the processor 120 may separate eigenvectors constituting the signal subspace and eigenvectors constituting the noise subspace, and complete the angle of arrival estimation based on the signal subspace by calculating a correlation matrix (correlation matrix) for the output 950 and performing eigenvalue decomposition on the correlation matrix.

Figure 15:
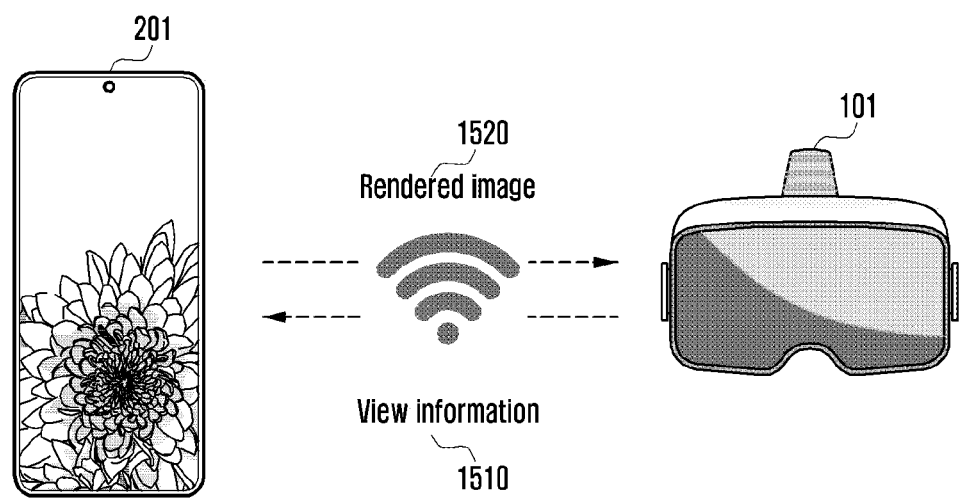
FIG. 15 is a view illustrating for explaining an example of operating an angle of arrival estimation method according to various example embodiments in a tethered AR system.

FIG. 15 is a view illustrating an example of operating a method of the angle of arrival estimation according to various embodiments operating in a tethered AR system.

According to an embodiment, in case of the tethered AR system, the electronic device 101 may receive the related data (e.g., an AR image) from the external device 201 in AR operation, and provide the received data together with real world data through the display module 160.

According to an embodiment, since the glasses-type electronic device 101 performs an operation for AR while worn on the user's body (e.g., head), the weight of the electronic device 101 may be a very important factor in terms of user's (e.g., consumer) usability. Therefore, for reducing the weight of the electronic device 101, in general the electronic device 101 may be constituted to include components (e.g., a camera module, a display module, or a sensor module) necessary to obtain state information of the electronic device 101 and/or environmental information around the electronic device 101 to provide AR services, and may be implemented in the form of a tethered AR system in which the electronic device 101 does not operate independently but is connected, directly or indirectly, to another processing device (e.g., the external device 201) to provide AR services.

For example, as illustrated in FIG. 15, the electronic device 101 may transmit view information 1510 such as an image (e.g., an image obtained through the camera module 180) and sensor information (e.g., information obtained through the sensor module 176) to the external device 201 (e.g., a processing device). For example, the electronic device 101 may provide (e.g., transmit) at least one information such as an image, device information, sensor information, function information, and/or position information to the external device 201 when connected, directly or indirectly, to the external device 201. According to an embodiment, the external device 201 may render an image obtained from the electronic device 101 and transmit the rendered image 1520 to the electronic device 101. According to an embodiment, the electronic device 101 and the external device 201 may be communicatively connected, directly or indirectly, through a local area network. For example, the local area network may include Bluetooth, wireless fidelity (WiFi) direct, or infrared data association (IrDA).

According to an embodiment, the electronic device 101 may receive a probing signal from the peripheral devices 200 on the data communication link and perform the angle of arrival estimation according to an example embodiment. According to an embodiment, in the tethered AR system, the electronic device 101 may be implemented to include minimal components with low performance for reducing weight thereof. Accordingly, it may be difficult for the electronic device 101 to perform a highly complex angle of arrival estimation calculation. In addition, in case that all the angle of arrival estimation calculations are performed in the external device 201, the electronic device 101 needs to transmit all raw channel information performed through the probing signal received from the peripheral device 200 to the external device 201. However, in case that all the low channel information is transmitted, there may be problems in that the current consumption of the electronic device 101 increases due to the large amount of data and the estimation precision decreases due to quantization error.

In various embodiments, the electronic device 101 and the external device 201 may distribute and perform operations related to the angle of arrival estimation by distinguishing between a part with low computational complexity and a part with high computational complexity in the angle of arrival estimation according to an example embodiment. For example, in the environment such as the tethered AR system, some operations for the angle of arrival estimation of the electronic device 101 according to an example embodiment may be distributed to and processed with the external device 201. An example related to this is illustrated in FIG. 16.

Figure 16:
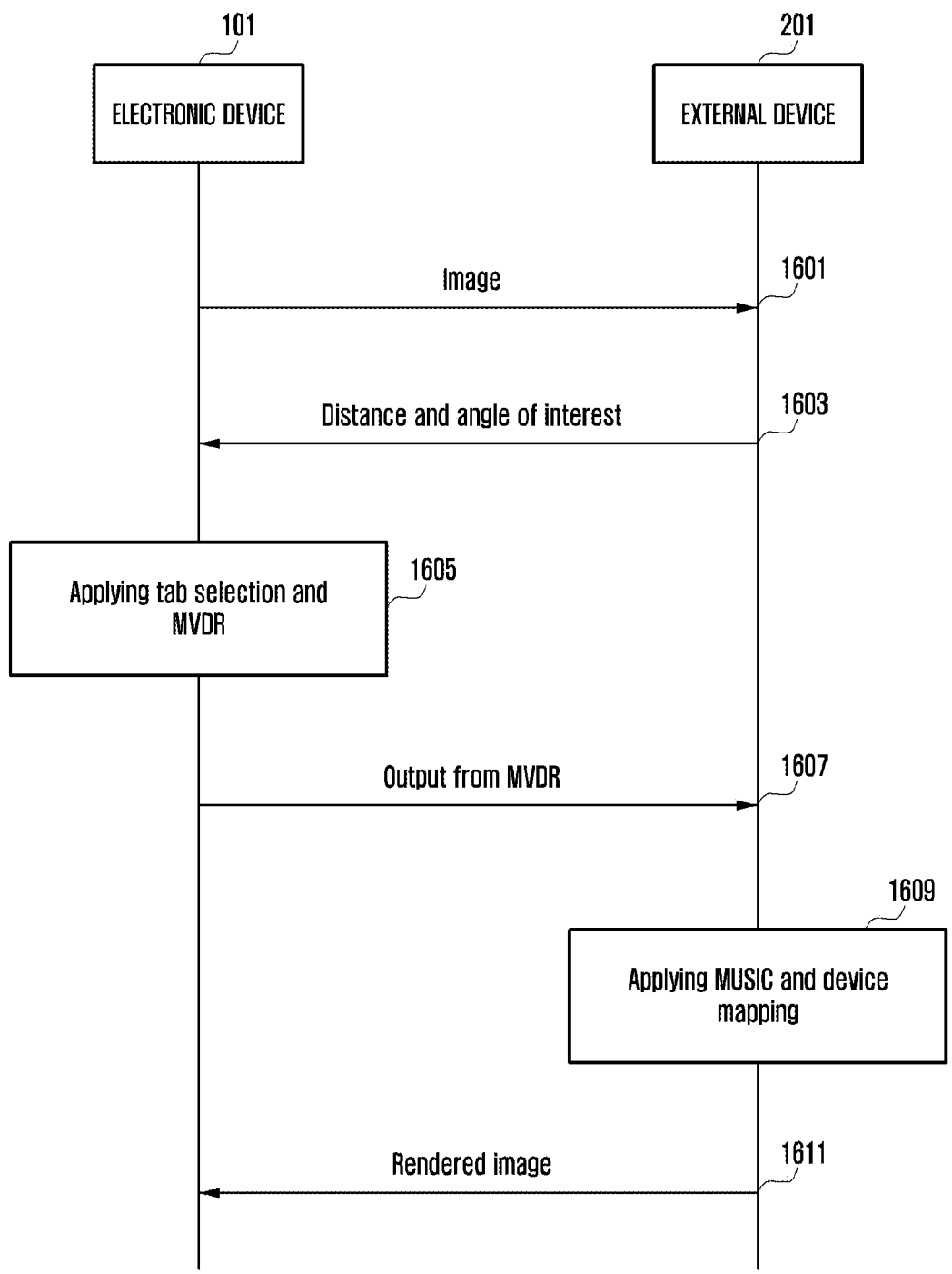
FIG. 16 is a view illustrating for explaining an operation example of an angle of arrival estimation in a tethered AR system according to various example embodiments.

FIG. 16 is a view illustrating an operation example of performing the angle of arrival estimation in the tethered AR system according to various embodiments.

According to an embodiment, in the tethered AR system, data exchange and protocol definition may be required between the electronic device 101 and the external device 201 to perform the angle of arrival estimation according to an example embodiment, and FIG. 16 may illustrate an example thereof.

Referring to FIG. 16, in operation 1601, when connected to the external device 201, the electronic device 101 may transmit an image obtained through the camera module 180 of the electronic device 101 to the external device 201. According to an embodiment, the electronic device 101 may transmit state information of the electronic device 101 obtained through the sensor module 176 to the external device 201. For example, the state information may include motion information of the electronic device 101 or user's gaze position information obtained through a gaze tracking camera.

In operation 1603, the external device 201 may transmit distance information and direction information estimated based on the image received from the electronic device 101 to the electronic device 101. For example, the external device 201 may receive an image from the electronic device 101 and recognize the target device on the received image through image processing. For another example, the external device 201 may recognize the target device based on the image received from the electronic device 101 and the state information of the electronic device 101. According to an embodiment, in case of recognizing the target device on the image, the external device 201 may estimate information of interest of the target device (e.g., distance information and direction information) and transmit the information of interest to the electronic device 101.

In operation 1605, the electronic device 101 may perform the CIR tab selection and apply the first estimation algorithm (e.g., MVDR) based on the information of interest received from the external device 201. According to an embodiment, the electronic device 101 may process the angle of arrival estimation operation based on the first estimation algorithm having a relatively low computational complexity among the angle of arrival estimation operations. For example, an estimation algorithm such as MVDR may be composed of simple addition and/or multiplication, and the electronic device 101 may perform an operation for a part with a low computational complexity.

In operation 1607, the electronic device 101 may transmit an output after applying the first estimation algorithm to the external device 201.

In operation 1609, the external device 201 may apply the second estimation algorithm (e.g., MUSIC) to the output received from the electronic device 101 and perform the target device mapping. According to an embodiment, the external device 201 may process the angle of arrival estimation operation based on the second estimation algorithm having a relatively high computational complexity among the angle of arrival estimation operations. For example, an estimation algorithm such as MUSIC may be composed of computations with high complexity, and the external device 201 with a relatively high performance may perform the calculations of a part with a high computational complexity. For example, the external device 201 may apply MUSIC to the output received from the electronic device 101 to complete the angle of arrival estimation.

In operation 1611, the external device 201 may transmit the rendered image to the electronic device 101. According to an embodiment, the external device 201 may provide, to the electronic device 101, an image in which the target device corresponding to the target object recognized on the image received from the electronic device 101 by a result of the angle of arrival estimation is mapped.

Figure 17:
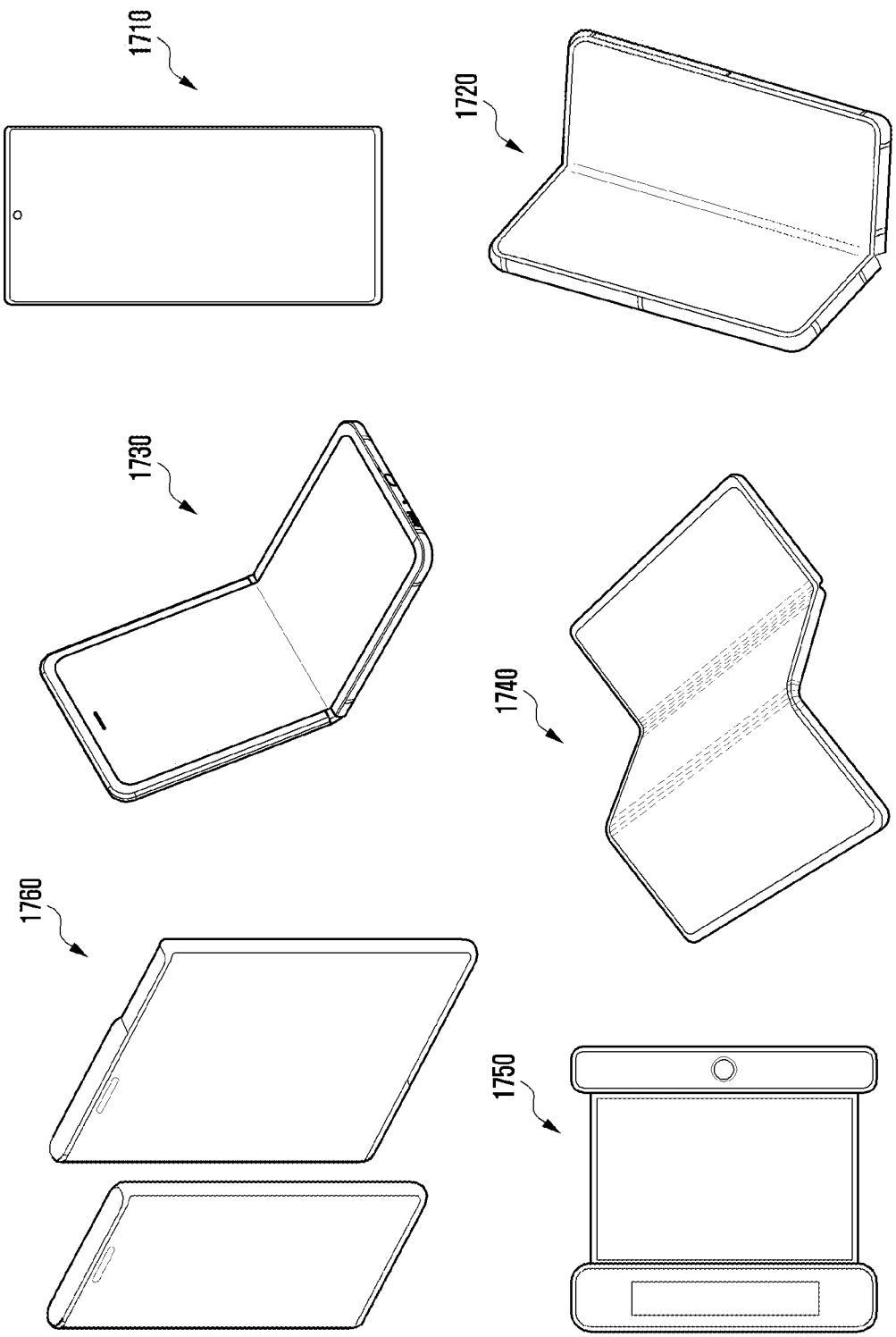
FIG. 17 is a view illustrating another example of an electronic device capable of using an angle of arrival estimation according to various example embodiments.

FIG. 17 is a view illustrating another example of the electronic device capable of using an angle of arrival estimation according to various embodiments.

According to an embodiment, FIG. 17 may illustrate another example of the electronic device 101 supporting an AR service according to various embodiments.

According to an embodiment, as illustrated in FIG. 17, the angle of arrival estimation operation according to an example embodiment, for example, may be performed in the electronic devices 101 of various form factors including a camera module (e.g., the camera module 180 of FIG. 3), a display module (e.g., the display module 160 of FIG. 3), and a communication module (e.g., the communication module 190 of FIG. 3). For example, FIG. 17 may illustrate examples of the electronic devices 101 of various form factors according to display types according to various embodiments.

According to an embodiment, the electronic device 101 may include various form factors such as a bar type or a plate type 1710, a foldable type 1720, 1730 or 1740, a rollable type 1750 and/or a slidable type 1760. For example, the electronic device 101 according to various example embodiments has a glass type appearance, but the present disclosure is not limited thereto. For example, the electronic device 101 according to an embodiment may be a part of a bar or flat type of electronic device 1710, a foldable type of electronic device 1720, 1730 or 1740, a rollable type of electronic device 1750 or a slidable type of electronic device 1760.

According to an embodiment, the foldable type of electronic device 1720, 1730, or 1740 may indicate an electronic device in which two different areas of the display module 160 is capable of being folded in a direction in which two different areas substantially face each other or in a direction in which two different areas are opposite to each other. For example, in the foldable type of electronic device 1720, 1730 or 1740, in a folded state, the display module 160 may be in a state in which two different areas face each other or are in opposite directions, and in an unfolded state, the display module 160 may be in a state in which two different areas substantially are formed of a flat type. According to an embodiment, the foldable electronic device 1720, 1730, or 1740 may include the camera module 180 and the antenna module 197 in at least a part of a housing (not illustrated) corresponding to two different areas of the display module 160, and directions in which the camera module 180 and the antenna module 197 are toward the outside may vary depending on the state of the display module 160.

According to an embodiment, the foldable type of electronic device 1720, 1730 or 1740 may include a form factor (e.g., 1720 or 1730) including two display surfaces (e.g., a first display surface and a second display surface) based on one folding axis, and/or a form factor (e.g., 1740) including at least three display surfaces (e.g., a first display surface, a second display surface, and a third display surface) based on at least two folding axes. Various embodiments are not limited thereto, and this is illustrative, and the number of folding axes that the electronic device 101 may have is not limited.

According to an embodiment, in the foldable electronic device 1720, 1730, or 1740, the display module 160 may be folded or unfolded in various ways (e.g., in-folding, out-folding, or in/out folding) according to the types to be implemented. According to an embodiment, the foldable type of electronic device 1720, 1730, or 1740 may include various foldable types such as a vertical foldable, a horizontal foldable, a G foldable, or a Z foldable.

According to an embodiment, the rollable type of electronic device 1750 or the slidable type of electronic device 1760 may indicate an electronic device, the display module 160 of which may be bent and deformed, so that at least a part of the display module 160 may be rolled or wound, or accommodated inside a housing (not illustrated). The rollable type of electronic device 1750 or the slidable type of electronic device 1760 may be used to expand the screen display area by exposing a larger area of the display module 160 or unfolding the display module 160 depending on the user's needs. According to an embodiment, the rollable type of electronic device 1750 or the slidable type of electronic device 1760 may include a form factor including a roll-up type display (e.g., a rollable display).

According to an embodiment, in the rollable type of electronic device 1750 or the slidable type of electronic device 1760, the area where the display is exposed to the outside may vary according to the extent to which the user unfolds the display module 160. According to an embodiment, the rollable type of electronic device 1750 or the slidable type of electronic device 1760 may include the camera module 180 and the antenna module 197 in at least a part of a housing (not illustrated) corresponding to two different areas of the display module 160, and directions in which the camera module 180 and the antenna module 197 are toward the outside may vary depending on the state of the display module 160.

According to an embodiment, as illustrated in FIG. 17, the electronic device 101 may be implemented in various types, and the display module 160, the camera module 180, and/or the communication module 190 (e.g., the antenna module 197 of FIG. 3) may be disposed in a various manner depending on the implemented types of the electronic device 101. For example, in case of the foldable type of electronic device 1720, 1730, or 1740, the rollable type of electronic device 1750, or the slidable type of electronic device 1760, the camera module 180 and the antenna module 197 may be differently positioned according to a folded state or an unfolded state of the display module 160.

According to an embodiment, the number of antennas or the number of antenna subsets used to be applied to the angle of arrival estimation operation according to an example embodiment may be different depending on an operating state (e.g., an unfolded or folded state of the display module 160) according to the form factors of the electronic device 101. For example, it may be assumed that the electronic device 101 has twelve antennas (e.g., N antennas in a first area and M antennas in a second area among two different areas of the display module 160). For example, when the electronic device 101 is in an unfolded state, the angle of arrival estimation may be performed using all twelve antennas positioned in two areas. As another example, when the electronic device 101 is in a folded state, the angle of arrival estimation may be performed using only an antenna (e.g., N antennas in the first area or M antennas in the second area) positioned in a direction (e.g., the front direction facing the user) in which the camera module 180 faces or positioned in an area where the camera module 180 is disposed (e.g., the first area or the second area).

For another example, the electronic device 101 may differently set the antenna subsets used to be applied to the angle of arrival estimation operation based on an operation state (e.g., an unfolded or folded state of the display module 160) of the electronic device 101. For example, the angle of arrival estimation may be performed using N antenna subsets when the electronic device 101 is in an unfolded state and using M antenna subsets when the electronic device 101 is in a folded state.

According to various embodiments, the angle of arrival estimation operation according to an example embodiment may be independently performed in the electronic device 101, or may be performed with being operatively connected to another electronic device (e.g., the external device 201) which is operable as a computing host. For example, in the hybrid method of the angle of arrival estimation according to an example embodiment, it may be operated to perform a distributed processing, such that the electronic device 1701 processes a low complexity computation (or a small amount of computation), and the external device 201 with a relatively high performance processes a high complexity computation (or a large amount of computation).

An operating method performed in the electronic device 101 according to various example embodiments may include: an operation of obtaining an image through the camera module 180 of the electronic device 101; an operation of transmitting at least a part of the obtained image to an external electronic device through the communication module 190; an operation of receiving an augmented reality (AR) image including at least one object based on the transmitted image from the external electronic device; an operation of displaying the AR image through the display module 160 of the electronic device 101; an operation of recognizing a target object from among the at least one object; and an operation of mapping one of peripheral devices found on a data communication link through the communication module 190 to the target device corresponding to the recognized target object.

According to various example embodiments, the operation of mapping may include: an operation of estimating a distance and direction to the target object on the AR image; an operation of identifying whether a signal transmitted from the target device on the data communication link is received from the estimated distance and direction; and an operation of mapping the target object and the target device in case that the signal transmitted from the target device is received from the estimated distance and direction.

According to various example embodiments, the operation of mapping may include: an operation of selecting a tab of interest to be used for an angle of arrival estimation based on the signal transmitted from the target device; an operation of generating a plurality of outputs by applying a first estimation algorithm to the tab of interest; and an operation of applying a second estimation algorithm to the plurality of outputs. "Based on" as used herein covers based at least on.

The various embodiments disclosed in the present specification and drawings are provided as examples merely for easily explaining the technical contents and helping understand the present disclosure, but not intended to limit the scope of the technology disclosed in the present disclosure. Therefore, the scope should be interpreted that all changes or modified forms derived based on the technical spirit of the present disclosure fall within the scope in addition to the embodiments disclosed herein. While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a display;
   a camera;
   a communication circuitry; and
   at least one processor comprising processing circuitry; and
   memory storing instructions that, when executed by the at least one processor, cause the electronic device to:
   control to transmit an image obtained through the camera to an external device through the communication circuitry;
   receive an augmented reality (AR) image including at least one object related to at least one peripheral device that exists around the electronic device from the external device through at least the communication circuitry;
   control to display the AR image including the at least one object through the display;
   recognize a target object from among the at least one object;
   determine, based on signals transmitted by a plurality of peripheral devices on a data communication link, location information of the plurality of peripheral devices on the data communication link;
   determine location information of the target object in the AR image; and
   map, based on the determined location information of the target object in the AR image and the determined location information of the plurality of peripheral devices on the data communication link a peripheral device among the plurality of peripheral devices found on the data communication link to a target device corresponding to the recognized target object in the AR image.

2. The electronic device of claim 1, wherein the instructions, when executed by the at least one processor, cause electronic device to:
   estimate a distance and direction to the target object on the AR image,
   identify whether a signal transmitted from the target device on the data communication link is received from the estimated distance and direction, and
   map the target object and the target device when the signal transmitted from the target device is received from the estimated distance and direction.

3. The electronic device of claim 2, wherein the instructions, when executed by the at least one processor, cause electronic device to:
   perform a first operation for an angle of arrival (AoA) estimation for the target device by applying a designated first estimation algorithm, and
   perform a second operation for the angle of arrival estimation at least by applying a second estimation algorithm designated based on an estimation result according to the performing of the first operation.

4. The electronic device of claim 3, wherein the instructions, when executed by the at least one processor, cause electronic device to perform a channel impulse response (CIR) tab selection based on the signal from the target device.

5. The electronic device of claim 3, wherein the instructions, when executed by the at least one processor, cause electronic device to select a tab of interest to be used for the angle of arrival estimation from among a plurality of tabs sampled at a predetermined interval for the signal from the target device,
wherein the tab of interest comprises a tab which corresponds to a value obtained at least by dividing the corresponding distance by a speed of an electromagnetic wave based on the distance estimated on the AR image.

6. The electronic device of claim 5, wherein the instructions, when executed by the at least one processor, cause electronic device to:
generate a plurality of outputs at least by applying the first estimation algorithm to the tab of interest, and
apply the second estimation algorithm to the plurality of outputs,
wherein the first estimation algorithm comprises an algorithm for estimating a signal in a specific direction by beamforming, and the second estimation algorithm comprises an algorithm for separating a designated signal and noise.

7. An electronic device comprising:
a camera;
a display;
a communication circuitry; and
at least one processor comprising processing circuitry; and
memory storing instructions that, when executed by the at least one processor, cause the electronic device to:
control to transmit an image obtained through the camera to an external device through the communication circuitry;
receive an augmented reality (AR) image based on the transmitted image from the external device;
control to display the received AR image through the display;
estimate a distance and direction to a target object on the AR image displayed through the display based on sensing information using at least one sensor;
perform a tab selection among a plurality of channel impulse response tabs sampled at a predetermined interval based on a signal transmitted by the target object and the distance and direction estimated to the target object on the AR image;
apply a first estimation algorithm to the selected tab to obtain, for each antenna subset of a plurality of antennas of the communication circuitry, an output by using at least the estimated distance and direction; and
estimate an angle of arrival (AoA) at least by applying a second estimation algorithm to the outputs obtained by applying the first estimation algorithm to the antenna subsets.

8. The electronic device of claim 7, wherein the first estimation algorithm comprises an algorithm for estimating a signal in a specific direction by beamforming, and the second estimation algorithm comprises an algorithm for separating a designated signal and noise.

9. The electronic device of claim 7, wherein the instructions, when executed by the at least one processor, cause electronic device to:
recognize the target object on the image obtained through the camera and displayed through the display,
estimate a distance and direction to the recognized target object,
select a tab corresponding to the estimated distance and direction on the image as a tab of interest to be used for the angle of arrival estimation among a plurality of tabs sampled at a predetermined interval, and
provide the selected tab of interest as an input for applying the first estimation algorithm.

10. The electronic device of claim 7, wherein the instructions, when executed by the at least one processor, cause electronic device to generate the antenna subset including a designated number of antennas based on the plurality of antennas.

11. The electronic device of claim 10, wherein the instructions, when executed by the at least one processor, cause electronic device to generate the antenna subset by overlapping at least one antenna in each of the antenna subsets to have a maximum and/or large number of antenna subsets.

12. The electronic device of claim 11, wherein the instructions, when executed by the at least one processor, cause electronic device to:
generate a plurality of outputs corresponding to the number of antenna subsets at least by applying the first estimation algorithm to the antenna subsets, and
apply the second estimation algorithm to the plurality of outputs.

13. The electronic device of claim 12, wherein the instructions, when executed by the at least one processor, cause the electronic device to:
separate eigenvectors constituting a signal subspace and eigenvectors constituting a noise subspace for the plurality of outputs, and
complete the angle of arrival estimation based on the signal subspace.

14. A method of operating an electronic device, the method comprising:
obtaining an image through a camera of the electronic device;
transmitting at least a part of the obtained image to an external device;
receiving an augmented reality (AR) image including at least one object related to at least one peripheral device that exist around the electronic device based on the transmitted image, from the external device;
displaying the AR image including the at least one object via a display of the electronic device;
recognizing a target object from among the at least one object;
determining, based on signals transmitted by a plurality of peripheral devices on a data communication link, location information of the plurality of peripheral devices on the data communication link;
determining location information of the target object in the AR image; and
mapping, based on the determined location information of the target object in the AR image and the determined location information of the plurality of peripheral devices on the data communication link, a peripheral device among the plurality of peripheral devices found on the data communication link to a target device corresponding to the recognized target object in the AR image.

15. The method of claim 14, wherein the mapping of one of peripheral devices comprises:
estimating a distance and direction to the target object on the AR image;
identifying whether a signal transmitted from the target device on the data communication link is received from the estimated distance and direction; and
mapping the target object and the target device in case that the signal transmitted from the target device is received from the estimated distance and direction.

16. The electronic device of claim 7, wherein the antenna subsets of a plurality of antennas have at least one antenna which is included in an antenna subset adjacent to each other.

17. The electronic device of claim 7, wherein the selected tab corresponds to a value obtained by dividing the estimated distance of the target object by a speed of an electromagnetic wave transmitted by the communication circuit.

18. A non-transitory computer-readable recording medium storing a program which, when executed, causes an electronic device to perform operations comprising:
- obtaining an image through a camera of the electronic device,
- transmitting at least a part of the obtained image to an external device,
- receiving an augmented reality (AR) image including at least one object related to at least one peripheral device that exist around the electronic device based on the transmitted image, from the external device,
- displaying the AR image including the at least one object via a display of the electronic device,
- recognizing a target object from among the at least one object,
- determining, based on signals transmitted by a plurality of peripheral devices on a data communication link, location information of the plurality of peripheral devices on the data communication link;
- determining location information of the target object in the AR image; and
- mapping, based on the determined location information of the target object in the AR image and the determined location information of the plurality of peripheral devices on the data communication link, a peripheral device among the plurality of peripheral devices found on the data communication link to a target device corresponding to the recognized target object in the AR image.

19. The electronic device of claim 1, wherein the location information of the plurality of peripheral devices on the data communication link includes distance and direction information of the plurality of peripheral devices.

* * * * *